US012804032B2

(12) United States Patent
Otani et al.

(10) Patent No.: US 12,804,032 B2
(45) Date of Patent: Nov. 17, 2026

(54) ACCELERATOR OFFLOAD DEVICE AND ACCELERATOR OFFLOAD METHOD

(71) Applicant: NTT, Inc., Tokyo (JP)

(72) Inventors: Ikuo Otani, Musashino (JP); Kei Fujimoto, Musashino (JP)

(73) Assignee: NTT, Inc., Tokyo (JP)

( * ) Notice: Subject to any disclaimer, the term of this patent is extended or adjusted under 35 U.S.C. 154(b) by 92 days.

(21) Appl. No.: 18/875,841

(22) PCT Filed: Jun. 17, 2022

(86) PCT No.: PCT/JP2022/024421
§ 371 (c)(1),
(2) Date: Dec. 17, 2024

(87) PCT Pub. No.: WO2023/243099
PCT Pub. Date: Dec. 21, 2023

(65) Prior Publication Data

US 2026/0156176 A1 Jun. 4, 2026

(51) Int. Cl.
*H04L 67/101* (2022.01)
*G06F 9/30* (2018.01)
(Continued)

(52) U.S. Cl.
CPC ........ *H04L 67/101* (2013.01); *G06F 9/30043* (2013.01); *G06F 9/3851* (2013.01); *H04L 47/20* (2013.01)

(58) Field of Classification Search
CPC ............... G09F 9/3851; G09F 9/30043; G09F 9/30032; H04L 47/20
See application file for complete search history.

(56) References Cited

U.S. PATENT DOCUMENTS

2015/0223102 A1* 8/2015 Raleigh .................. H04L 47/20 370/230
2019/0364492 A1* 11/2019 Azizi .................... H04W 48/16
(Continued)

FOREIGN PATENT DOCUMENTS

JP 2018045415 A 3/2018

OTHER PUBLICATIONS

DPDK.org [online], "Wireless Base Band Device (BBDEV) API (connection information is on p. 5)," Sep. 2017, retrieved on Jun. 6, 2022, retrieved from URL<http://fast.dpdk.org/events/slides/DPDK-2017-09-BBdev.pdf>, 15 pages.
(Continued)

*Primary Examiner* — Barbara B Anyan
(74) *Attorney, Agent, or Firm* — Fish & Richardson P.C.

(57) ABSTRACT

An accelerator offload device includes: a traffic collection part that collects traffic information; a device emulation part that conceals connection destination switching so as to pretend that an application is communicating with an accelerator; an offload destination determination part that determines an offload destination based on the collected traffic information and provides offload destination information pertinent to the application; an offload destination connection part that connects the device emulation part and the accelerator of the offload destination according to the provided offload destination information; and a device control part that performs power operation of a device including the accelerator according to an instruction of the offload destination determination part.

9 Claims, 24 Drawing Sheets

(51) Int. Cl.
*G06F 9/38* (2018.01)
*H04L 47/20* (2022.01)

(56) References Cited

U.S. PATENT DOCUMENTS

| | | | | |
|---|---|---|---|---|
| 2022/0222075 | A1* | 7/2022 | Pawlowski | G06F 9/30032 |
| 2023/0049442 | A1* | 2/2023 | Hung | G06F 9/30043 |
| 2024/0256283 | A1* | 8/2024 | Fryman | G06F 9/3851 |

OTHER PUBLICATIONS

International Search Report in International Appln. No. PCT/JP2022/024421, mailed Sep. 13, 2022, 2 pages.
Kaneki et al. "Power-Aware Dynamic Allocation-control Technology for Maximizing Power Efficiency in a Photonic Disaggregated Comupter" NTT Technical Journal, May 2021, 33(5):54-57 (ISR as concise explanation of relevance).

* cited by examiner

FIG. 2

201

| App ID | Device ID |
|---|---|
| 0 | 0 |
| 1 | 0 |
| 2 | 0 |
| 3 | 1 |
| 4 | 1 |
| ⋮ | ⋮ |

FIG. 3

202

| APL ID | Performance value | Performance threshold | Operating state |
|---|---|---|---|
| 0 | 10 μs | 100 μs | Active |
| 1 | 20 μs | 200 μs | Active |
| ⋮ | ⋮ | ⋮ | ⋮ |

FIG. 4

203

| APL ID | Traffic | Traffic Prediction Value |
|---|---|---|
| 0 | 10/s | 10/s |
| 1 | 20/s | 30/s |
| ⋮ | ⋮ | ⋮ |

FIG. 5

204

| Device ID | Traffic | Traffic prediction value | Traffic lower limit value | Traffic upper limit value |
|---|---|---|---|---|
| 0 | 50/s | 30/s | 40/s | 90/s |
| 1 | 100/s | 150/s | 50/s | 180/s |
| ⋮ | ⋮ | ⋮ | ⋮ | ⋮ |

FIG. 6

205

| Device ID | Capacity | Free capacity | Power state |
|---|---|---|---|
| 0 | 100/s | 50/s | ON |
| 1 | 200/s | 100/s | ON |
| ⋮ | ⋮ | ⋮ | ⋮ |

ACCELERATOR OFFLOAD DEVICE AND ACCELERATOR OFFLOAD METHOD

CROSS-REFERENCE TO RELATED APPLICATIONS

This is a National Stage Application of PCT Application No. PCT/JP2022/024421, filed on Jun. 17, 2022. The disclosure of the prior application is considered part of the disclosure of this application, and is incorporated in its entirety into this application.

BACKGROUND

Technical Field

The present invention relates to an accelerator offload device and an accelerator offload method.

Background Art

Workloads that processors are good at (have high processing capability for) are different depending on the types of processors. Central processing units (CPUs) have high versatility, but are not good at (have low processing capability for) operating a workload having a high degree of parallelism, whereas accelerators (hereinafter, referred to as ACCs as appropriate), such as a field programmable gate array (FPGA)/(hereinafter, "/" means "or") a graphics processing unit (GPU)/an application specific integrated circuit (ASIC), can operate the workload at high speed with high efficiency. Offload techniques, which improve overall operation time and operation efficiency by combining those different types of processors and offloading a workload that CPUs are not good at to ACCs to operate the workload, have been increasingly utilized.

In a virtual radio access network (vRAN) or the like, when a CPU alone has insufficient performance to satisfy the requirements, part of processing is offloaded to an accelerator capable of performing high-speed operation such as an FPGA or a GPU.

Representative examples of a specific workload subjected to ACC offloading include encoding/decoding processing (forward error correction processing (FEC)) in a vRAN, audio and video media processing, and encryption/decryption processing.

Further, data transfer techniques in a server include new API (NAPI), Data Plane Development Kit (DPDK), and kernel busy poll (KBP). KBP constantly monitors packet arrivals according to a polling model in the kernel. With this, softIRQ is restrained to achieve low-latency packet processing.

New API (NAPI), upon arrival of a packet, performs packet processing in response to, after a hardware interrupt request, a software interrupt request.

DPDK implements a packet processing function in the user space in which applications operate and, upon a packet arrival, immediately perform dequeuing of the packet from the user space according to a polling model (see Non-Patent Literature 1). Specifically, DPDK is a framework for performing control on a network interface card (NIC) in the user space, which has been conventionally performed by the Linux kernel (registered trademark). The largest difference from the processing by the Linux kernel is to have a polling-based reception mechanism called Pull Mode Driver (PMD). Normally, in the Linux kernel, an interrupt is generated upon arrival of data to the NIC, and reception processing is triggered by an interrupt. On the other hand, in PMD, a dedicated thread continuously performs checking data arrival and reception processing. By eliminating overheads such as context switches and interrupts, high-speed packet processing can be performed. DPDK greatly improves the performance and throughput of packet processing, thereby securing more time for data plane application processing. However, the DPDK exclusively uses computer resources such as a central processing unit (CPU) and an NIC.

Next, a description will be given of a DPDK system.

[DPDK System Configuration]

FIG. 27 is a diagram illustrating a configuration of a DPDK system that controls HW 10 including accelerators 11 and 21.

The DPDK system includes HW 10, packet processing application programming interfaces (APIs) 14 and 24, and applications APL 1 and APL 2.

APL 1 and APL 2 are packet processing performed prior to execution of the APL.

The packet processing APIs 14 and 24 are APIs for offloading packet processing to the NIC or the accelerator. The packet processing APIs 14 and 24 are high-speed data transfer middleware and are DPDK disposed in a user space.

DPDK implements a packet processing function in the user space in which the APL 1 and APL 2 operate, and performs dequeuing immediately upon a packet arrival according to a polling model from the user space to make it possible to reduce the packet transfer delay. In other words, as the DPDK performs dequeuing of packets by polling (busy polling a queue by the CPU) (references content of the packets accumulated in a buffer and, the processing of the packets, deletes corresponding queue entries from the buffer taking into account the processing to be performed next), there is no waiting and the delay is small.

HW 10 performs communication for data transmission/reception with APL 1 and APL 2. In the description below, the data flow in which APL 1 and APL 2 receive packets from HW 10 is referred to as Rx-side reception, and the data flow in which APL 1 and APL 2 transmit packets to HW 10 is referred to as Tx-side transmission.

HW 10 includes accelerators (ACC) 11 and 21. In addition, HW 10 may include NICs (physical NICs) for connecting to a communication network.

The accelerators 11 and 21 are computing unit hardware that perform a specific operation at high speed based on an input from the CPU. Specifically, accelerator 11 is a GPU or a programmable logic device (PLD) such as an FPGA. In FIG. 27, accelerators 11 and 21 include a plurality of intellectual property cores (IP cores) 12 and 22, and device queues 13 and 23 that are physical queues including an Rx queue and a Tx queue that hold data in a first-in first-out list structure. The IP cores 12 and 22 are design information of a reusable circuit component configuring a semiconductor such as an FPGA, an IC, or an LSI.

Part of processing of APL 1 and APL 2 is offloaded to accelerators 11 and 21 to achieve performance and power efficiency that cannot be achieved only by software (CPU processing).

It is conceivable that accelerator 11 described above is applied to a large-scale server cluster such as a data center that compose network functions virtualization (NFV) or a software defined network (SDN).

Existing applications (APL 1 and APL 2), such as DPDK, that transfer data to the accelerators in the poll mode operate by fixedly associating device queues 13 and 23 used by the applications at the time of initialization (see the dashed boxes in FIG. 27). An application thread (hereinafter referred to as an app thread) performs transmission/reception processing via a ring buffer (not illustrated) corresponding to accelerator 11. The app thread is a polling thread here.

CITATION LIST

Non Patent Literature

Non Patent Literature 1: BBDEV API (connection information is on page 5), [online], [searched on Jun. 6, 2022], the Internet <http://fast.dpdk.org/events/slides/DPDK-2017-09-BBdev.pdf>

SUMMARY OF THE INVENTION

Technical Problem

The threads of APLs 1 and 2 illustrated in FIG. 27 transmit requests to the accelerators 11 and 21 through packet processing application programming interfaces (APIs) and receive requests after the completion of the processing in the poll mode or an interrupt mode. Accelerator resources to/from which transmission/reception is performed by the threads are fixedly allocated at the time of initialization of APLs 1 and 2 on a per device queue 13,23 basis or the like (device queues 13 and accelerator 11 of APL 1 are fixedly allocated; and device queues 23 and accelerator 21 of APL 2 are fixedly allocated).

However, in a case where the traffic amount fluctuates greatly during a day like vRAN, if a plurality of accelerators is prepared to match the peak traffic, the resources become excessive when the traffic is low such as during the nighttime hours. The accelerators do not necessarily consume power in proportion to the inflow traffic, resulting in an increase in the power.

Problems of conventional techniques will be described with reference to FIGS. 28 and 29.

FIG. 28 is a diagram illustrating a traffic amount (the upper diagram of FIG. 28) and ACC power (the lower diagram of FIG. 28) in a case where the traffic amount greatly fluctuates during a day. FIG. 29 is a diagram schematically illustrating the resources in daytime hours in FIG. 28 and the resources in the nighttime hours in FIG. 28. The solid blocks in FIG. 29 indicate an ACC maximum allowable traffic and the hatching in FIG. 29 indicates ACC traffic.

When a plurality of accelerators is prepared to match the peak traffic, although the resources are appropriate as illustrated in the upper diagram of FIG. 29 in the daytime hours indicated by arrow a in FIG. 28, the resources are excessive as illustrated in the lower diagram of FIG. 29 in the nighttime hours indicated by arrow b in FIG. 28. In addition, the accelerator consumes power constantly during the time the accelerator has been configured (formed) and this power hardly affects use situation of the accelerator. Therefore, when the traffic is low in the nighttime hours or the like, there is a problem that resources become excessive and the power consumption increases (see arrow c in FIG. 28).

The present invention has been made in view of such a background, and an object of the present invention is to reduce power consumption of an accelerator without causing performance deterioration of an application due to the reduction in the power consumption of the accelerator while eliminating the need to add a function corresponding to power saving in the application.

Solution to Problem

To solve the above-described problem, there is provided an accelerator offload device including a plurality of accelerators and configured to offload specific processing of an application to the plurality of accelerators, the accelerator offload device including: a traffic collection part configured to collect traffic information, the traffic information including information on traffic at a current time of offload target processing being performed and/or predicted traffic prediction information; a device emulation part configured to conceal connection destination switching viewed from the application so as to pretend that the application is communicating with one of the plurality of accelerators; an offload destination determination part configured to determine an offload destination based on the traffic information collected by the traffic collection part and provide offload destination information pertinent to the application; an offload destination connection part configured to connect the device emulation part and an accelerator of the offload destination according to the offload destination information provided by the offload destination determination part, the accelerator of the offload destination being one of the plurality of accelerators; and a device control part configured to perform a power operation to power on or off one of the plurality of accelerators according to an instruction from the offload destination determination part.

Advantageous Effects of Invention

According to the present invention, it is possible to reduce the power consumption of an accelerator without causing performance deterioration of an application due to the reduction in the power consumption of the accelerator while eliminating the need of adding a function of supporting power saving in the application.

BRIEF DESCRIPTION OF DRAWINGS

FIG. 2 is a diagram illustrating a device mapping table of an accelerator offload device according to the embodiment of the present invention.

FIG. 3 is a diagram illustrating an application management table of the accelerator offload device according to the embodiment of the present invention.

FIG. 4 is a diagram illustrating a task table of the accelerator offload device according to the embodiment of the present invention.

FIG. 5 is a diagram illustrating a traffic table of the accelerator offload device according to the embodiment of the present invention.

FIG. 6 is a diagram illustrating a device management table of the accelerator offload device according to the embodiment of the present invention.

DESCRIPTION OF EMBODIMENTS

Hereinafter, a power saving accelerator management system and the like in a mode for carrying out the present invention (hereinafter, referred to as "present embodiment") will be described with reference to the drawings.

Overall Configuration

Figure 1:
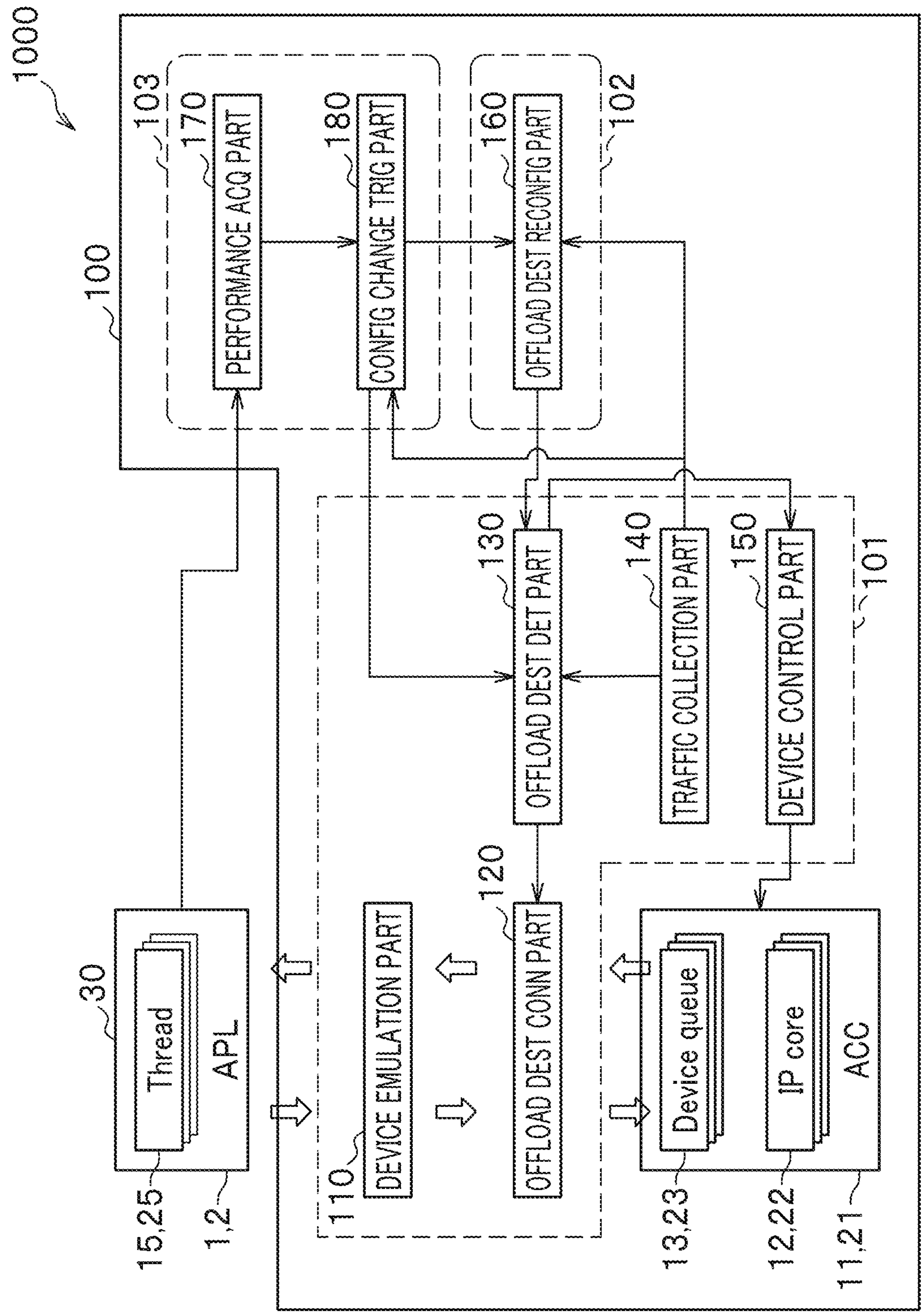
FIG. 1 is a schematic configuration diagram of a power saving accelerator management system according to an embodiment of the present invention.
Figure 27:
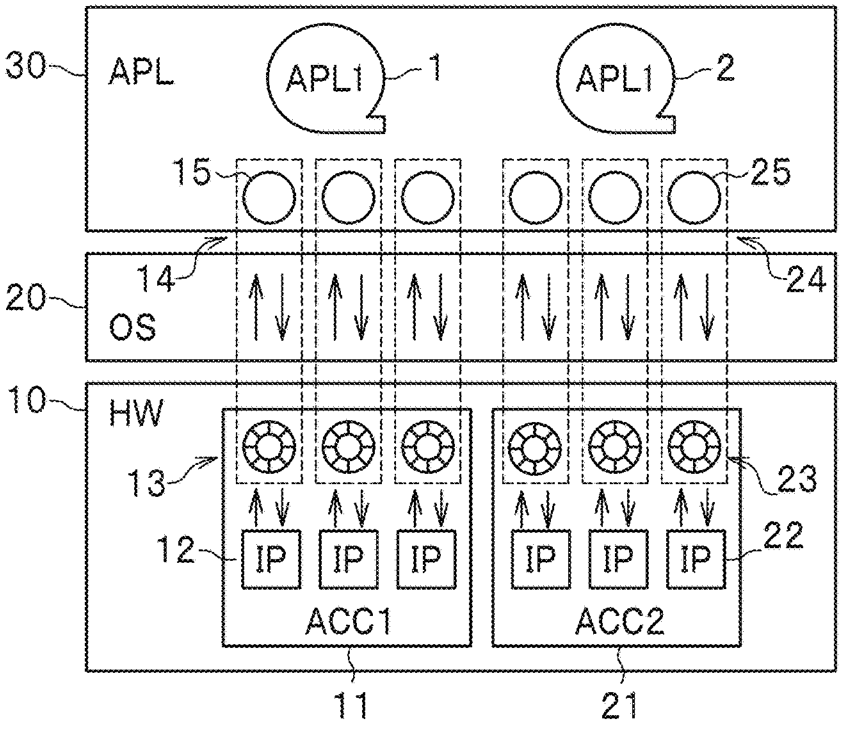
FIG. 27 is a diagram illustrating the configuration of a DPDK system that controls HW including an accelerator.
Figure 28:
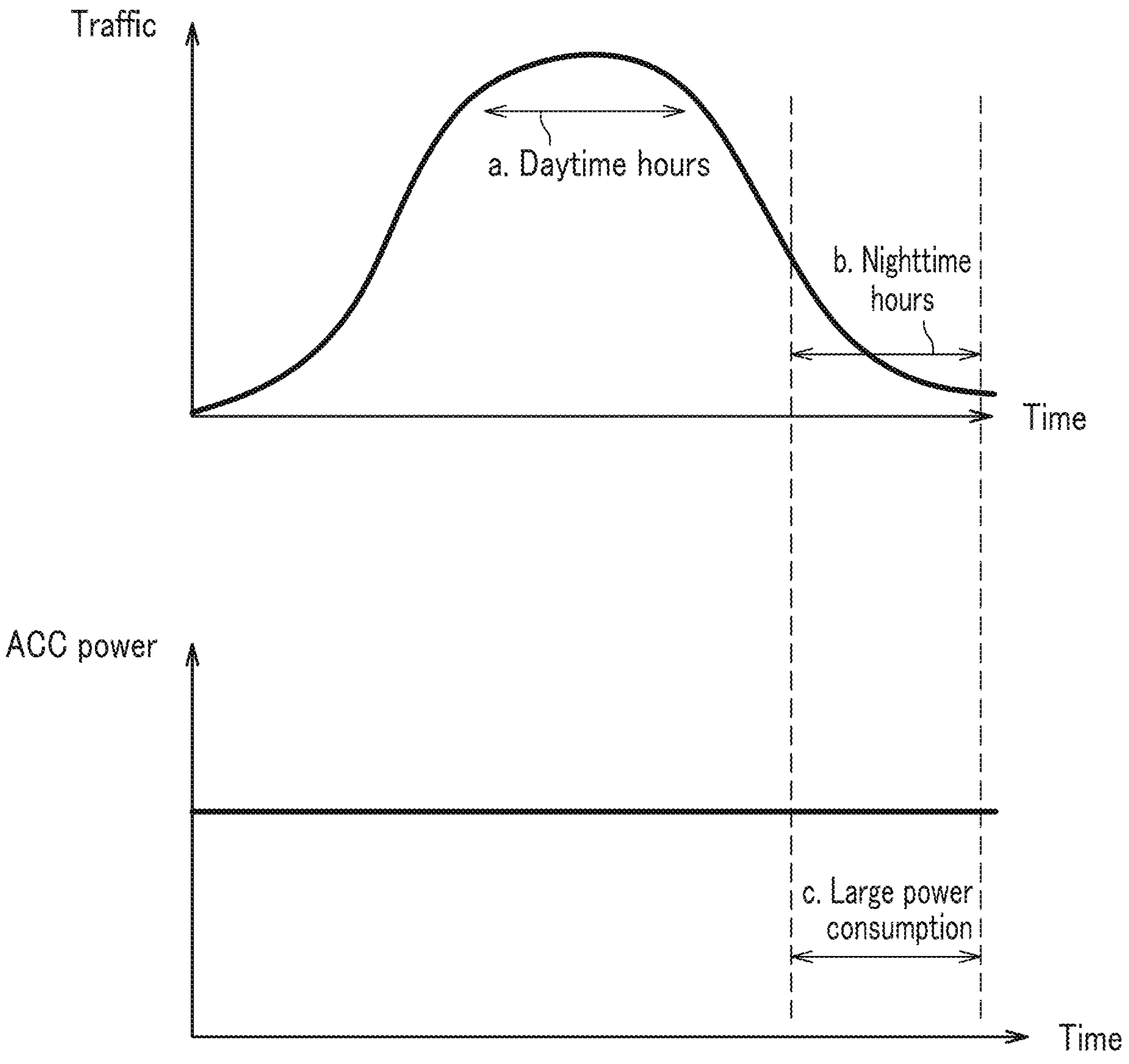
FIG. 28 is graphs illustrating a traffic amount and ACC power when the traffic amount greatly fluctuates during a day.
Figure 29:
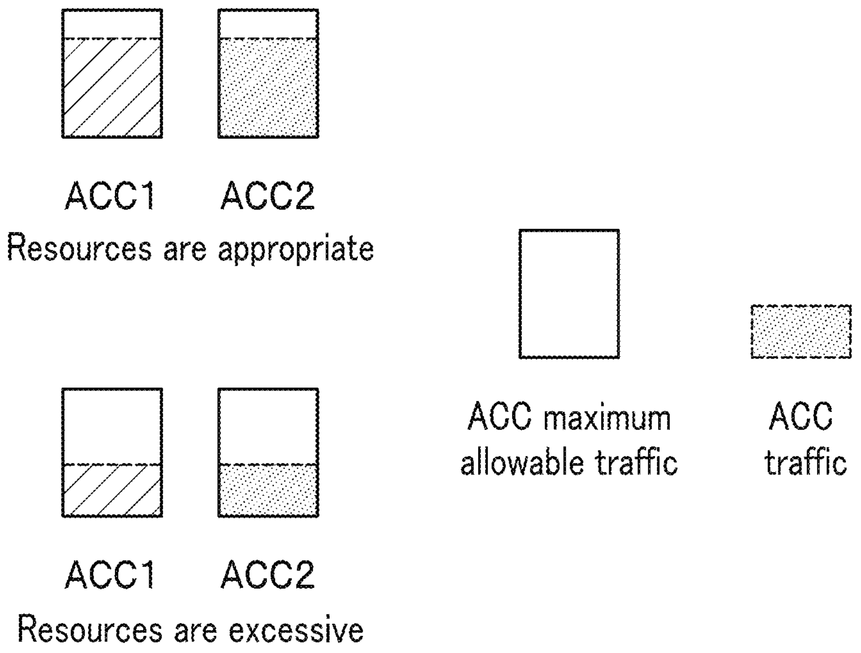
FIG. 29 is a diagram schematically illustrating resources in daytime hours and resources in nighttime hours in FIG. 28.

FIG. 1 is a schematic configuration diagram of a power saving accelerator management system according to an embodiment of the present invention. The same components as those in FIG. 27 are denoted by the same reference signs. In FIG. 1, a white arrow represents a flow of data, and a thin arrow represents a control signal.

As illustrated in FIG. 1, a power saving accelerator management system 1000 includes an APL 30 having a plurality of APLs 1 and 2 and a plurality of threads 15 and 25, an accelerator offload device 100, and accelerators (ACCs) 11 and 21 having a plurality of IP cores 12 and 22 and a plurality of device queues 13 and 23.

Accelerator offload device 100 is arranged between APL 30 and accelerators 11 and 21 mounted on HW. APL 30 is visible because it directly communicates with offload device 100, but physical devices 11 and 21 are not visible.

Accelerator Offload Device 100

Accelerator offload device 100 includes a device emulation part 110, an offload destination connection part 120, an offload destination determination part 130, a traffic collection part 140, a device control part 150, an offload destination reconfiguration part 160, a performance acquisition part 170, and a configuration change trigger part 180.

Here, device emulation part 110, offload destination connection part 120, offload destination determination part 130, traffic collection part 140, and device control part 150 constitute a functional part 101 for dynamically changing an offload destination accelerator and sharing the accelerator at the changed destination (Feature <1>). In addition, offload destination reconfiguration part 160 constitutes an offload destination reconfiguration part 102 that takes into account an optimum assignment (Feature <2>). In addition, performance acquisition part 170 and configuration change trigger part 180 constitute a scale trigger part 103 that is based on traffic and performance information (Feature <3>).

<Device Emulation Part 110<

Device emulation part 110 conceals connection destination switching viewed from the applications so as to pretend that APLs 1 and 2 (applications) are communicating with the accelerators.

<Offload Destination Connection Part 120>

Offload destination connection part 120 connects device emulation part 110 and the accelerator of the offload destination according to offload destination information provided by offload destination determination part 130 (according to the offload destination determined by offload destination determination part 130).

<Offload Destination Determination Part 130>

Offload destination determination part 130 determines the offload destination based on traffic information collected by traffic collection part 140 and provides the offload destination information pertinent to the application.

In addition, offload destination determination part 130 instructs device control part 150 to perform ACC power control.

Accelerator scaling-in of: by offload destination determination part 130, when the traffic decreases, switching the offload destination of a task on one of the accelerators to the other accelerator; and by device control part 150, powering off the pertinent accelerator is performed.

<Traffic Collection Part 140>

Traffic collection part 140 collects traffic information at the current time of the offload target processing being performed and/or predicted traffic prediction information (FIG. 22 to be described below) and provides the collected information to offload destination determination part 130.

<Device Control Part 150>

Device control part 150 performs a power operation to power on or off the device including an accelerator according to the instruction of offload destination determination part 130.

Accelerator scaling-out of: by device control part 150, performing a power operation to power on a surplus accelerator; and by offload destination determination part 130, switching the offload destination of a part of the task on an accelerator having performance concerns to the pertinent accelerator is performed.

<Offload Destination Reconfiguration Part 160>

Offload destination reconfiguration part 160 recalculates the offload destinations based on the traffic information collected by traffic collection part 140 and provides offload destination reconfiguration information to offload destination determination part 130. Specifically, offload destination reconfiguration part 160 initializes the current offload destinations of each of APLs 1 and 2 based on the traffic information obtained from traffic collection part 140, determines the appropriate offload destinations from scratch, and provides the offload destination reconfiguration information to offload destination determination part 130.

Here, offload destination reconfiguration part 160 may be independently provided in an external server. By causing offload destination reconfiguration part 160 to be independently provided in an external server, application to an RAN intelligent controller (RIC) or the like in a RAN is possible.

Case of Accelerator Scale-In

When an accelerator whose power is larger than an accelerator that has been powered off through accelerator scaling-in can be powered off, offload destination reconfiguration part 160 provides offload destination reconfiguration information to offload destination determination part 130 to modify the offload destination of task(s) to the pertinent accelerator. Offload destination determination part 130, upon reception of this provision, modifies the offload destinations of the task(s) based on the offload destination reconfiguration information, and device control part 150 powers off the accelerator whose power is large.

Case of Task Load Distribution

Offload destination reconfiguration part 160 recalculates the offload destinations based on the traffic information collected by traffic collection part 140, and when it is possible to perform task load distribution for each minimum required ACC, provides the offload destination reconfiguration information to offload destination determination part 130 to modify the offload destinations of the tasks. Offload destination determination part 130, upon reception of this provision, modifies the offload destinations of the tasks based on the offload destination reconfiguration information.

<Performance Acquisition Part 170>

Performance acquisition part 170 acquires performance information (performance information on each of APLs 1 and 2) including a delay and a throughput of the application and notifies configuration change trigger part 180 of the performance information.

<Configuration Change Trigger Part 180>

Configuration change trigger part 180 determines whether to issue an accelerator scale-in or an accelerator scale-out based on the traffic information collected by traffic collection part 140 and the performance information acquired by performance acquisition part 170 and causes offload destination determination part 130 to trigger accelerator scaling-in or accelerator scaling-out or causes offload destination reconfiguration part 160 to trigger offload destination reconfiguration.

Configuration change trigger part 180 performs scale-out determination based on the performance of each of APLs 1 and 2. Configuration change trigger part 180, when scaling-out is unnecessary, requests traffic information from traffic collection part 140.

Here, performance acquisition part 170 and configuration change trigger part 180 may be independently provided in the external server. By causing performance acquisition part 170 and configuration change trigger part 180 to be independently provided in the external server, application to an RIC in a RAN or the like is possible.

Tables

A description will be given of tables included in each functional part of the accelerator offload device 100.

FIG. 2 is a diagram illustrating a device mapping table 201 that is referenced by offload destination determination part 130 and written by offload destination connection part 120.

The device mapping table 201 associates app IDs with device IDs.

FIG. 3 is a diagram illustrating an application management table 202 that is referenced by configuration change trigger part 180 and written by performance acquisition part 170.

The application management table 202 stores a performance value, a performance threshold, and an operating state for each APL ID.

The performance threshold and the performance value are, for example, delay times. The operating state is active/down or the like.

FIG. 4 is a diagram illustrating a task table 203 that is referenced by offload destination determination part 130 and offload destination reconfiguration part 160 and written by traffic collection part 140.

The task table 203 stores traffic and a traffic prediction value for each APL ID.

FIG. 5 is a diagram illustrating a traffic table 204 that is referenced by offload destination determination part 130, offload destination reconfiguration part 160, and configuration change trigger part 180 and written by traffic collection part 140.

The traffic table 204 stores a traffic, a traffic prediction value, a traffic lower limit value, and a traffic upper limit value for each device ID.

FIG. 6 is a diagram illustrating a device management table 205 that is referenced by offload destination determination part 130 and offload destination reconfiguration part 160 and written by device control part 150.

The device management table 205 stores a capacity, a free capacity, and a power state for each device ID.

The above power state is On/off/degenerated or the like of the accelerator.

Hereinafter, a description will be given of an operation of the power saving accelerator management system configured as described above.

Feature and Operation Image

Feature <1>: Dynamic Change of an Offload Destination Accelerator and Sharing of the Accelerator at the Changed Destination <Requirement 1: Transparency> is satisfied by switching the offload destination of a task without changing the application. <Requirement 2: Power saving property> is satisfied by performing a power operation such as to power off an accelerator in which an offload task has gone.

When there is a performance concern, <Requirement 3: Performance> is satisfied by performing a power operation such as to power on an accelerator and adding the accelerator as the offload destination.

Feature <2>: Reconfiguration of Offload Destinations Taking into Account Optimum Assignment <Requirement 2: power saving property> and <Requirement 3: Performance> are simultaneously satisfied by calculating, based on the traffic amount at the current time, to which accelerator the task of each application should be offloaded to reduce the power while satisfying the performance to determine the offload destination.

Feature <3>: Scale Triggering Based on Traffic/Performance Information

By triggering a change of the offload destination in a timely manner according to the traffic and performance values, <Requirement 2: Power saving property> and <Requirement 3: Performance> are satisfied at the same time.

Dynamic Change of Offload Destination Accelerator and Sharing of Accelerator at Changed Destination (Feature <1>)

A description will be given of dynamic change of an offload destination accelerator and sharing of the accelerator at the changed destination (Feature <1>).

Figure 7:
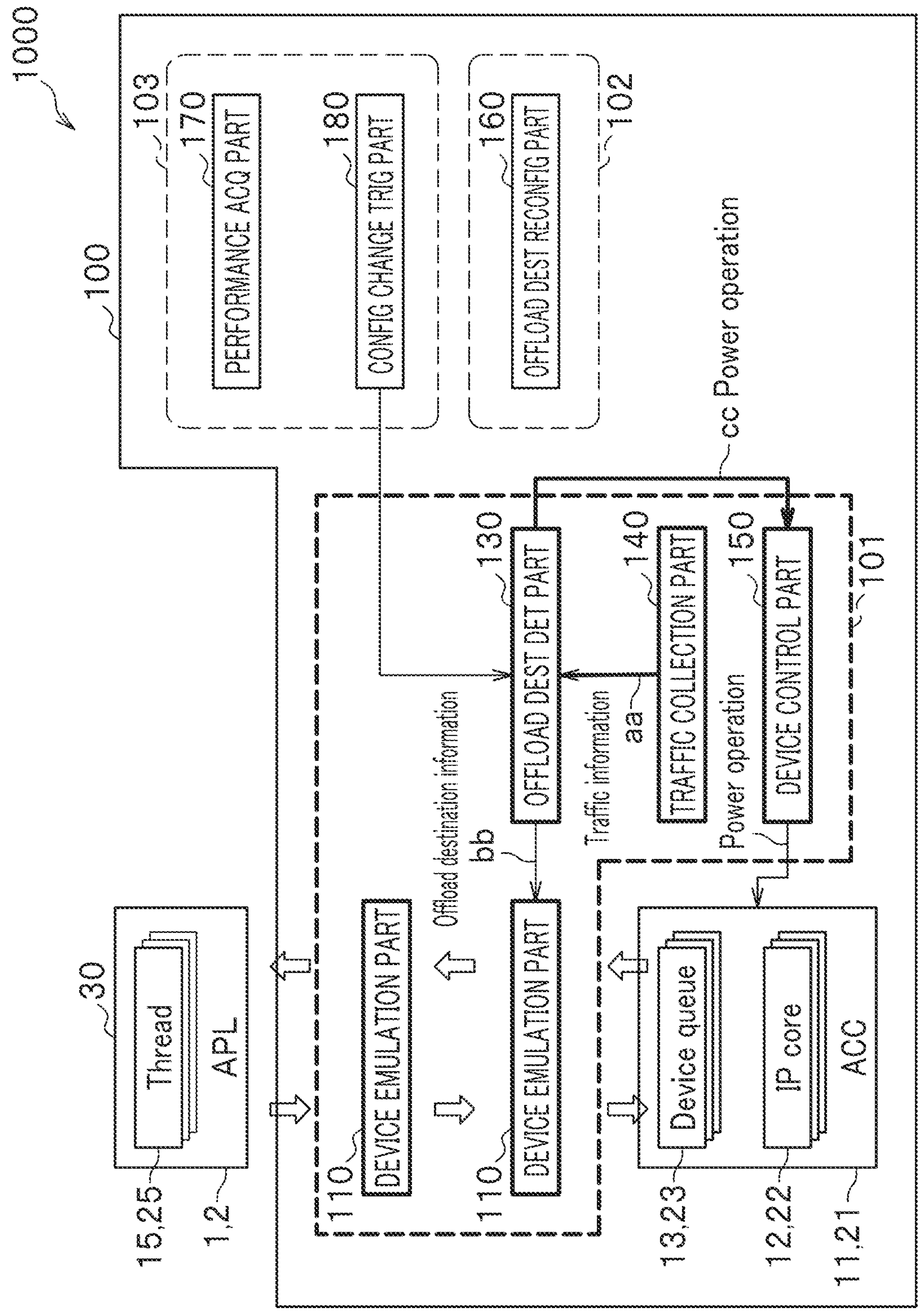
FIG. 7 is an operation explanatory diagram illustrating dynamic change of an offload destination accelerator and sharing of the accelerator at the changed destination (Feature <1>) of the accelerator offload device according to the embodiment of the present invention.

FIG. 7 is an operation explanatory diagram of the power saving accelerator management system for describing dynamic change of an offload destination accelerator and sharing of the accelerator at the changed destination (Feature <1>). The same components as those in FIG. 1 are denoted by the same reference signs. The functional parts pertinent to the operations described in the following description are represented by thick frames.

Feature <1> is achieved by functional part 101 indicated by a dashed line in FIG. 7. Specifically, it is described below.

<Operation in Feature <1> of Device Emulation Part 110>

Device emulation part 110 conceals the connection destination switching by pretending to communicate with an accelerator from the perspectives of APLs 1 and 2.

Device emulation part 110 is connected to APLs 1 and 2 via an interface equivalent to the existing interface, and provides virtual queues (not illustrated) instead of the physical queues 13 and 23 of the devices.

Device emulation part 110 corresponds to the physical queues of the device and connects the devices to APLs 1 and 2 by causing the app threads 15 and 25 to perform packet processing using the virtual queues instead of the physical queues. The virtual queues are queues shown to the app threads 15 and 25 instead of the physical queues (device queues) 13 and 23.

Although APLs 1 and 2 are not made aware of whether the actual specific device is accelerator 11 or accelerator 21, it is desirable to conceal the underlying specific devices by causing them to communicate with the abstracted accelerators. Device emulation part 110 connects to APLs 1 and 2 via an interface equivalent to an existing accelerator and provides the virtual queues instead of the physical queues 13 and 23 of the device. This makes it appear that APLs 1 and 2 is constantly communicating with the accelerators.

<Operation in Feature <1> of Offload Destination Connection Part 120>

Offload destination connection part 120, according to the offload destination determined by offload destination determination part 130, connects device emulation part 110 and the accelerator of the offload destination.

<Operation in Feature <1> of Traffic Collection Part 140>

Traffic collection part 140 collects traffic of the ACC resources at the current time and provides the traffic to offload destination determination part 130 (see arrow aa in FIG. 7).

<Operation in Feature <1> of Offload Destination Determination Part 130>

Offload destination determination part 130 determines the offload destinations based on the traffic information of traffic collection part 140 and provides offload destination connection part 120 with the offload destination information pertinent to the app (see arrow bb in FIG. 7).

Offload destination determination part 130 instructs device control part 150 to perform ACC power control (see arrow cc in FIG. 7).

<Operation in Feature <1> of Device Control Part 150>

Device control part 150 performs the power operation to power on or off the device according to the instruction of offload destination determination part 130.

Figure 8:
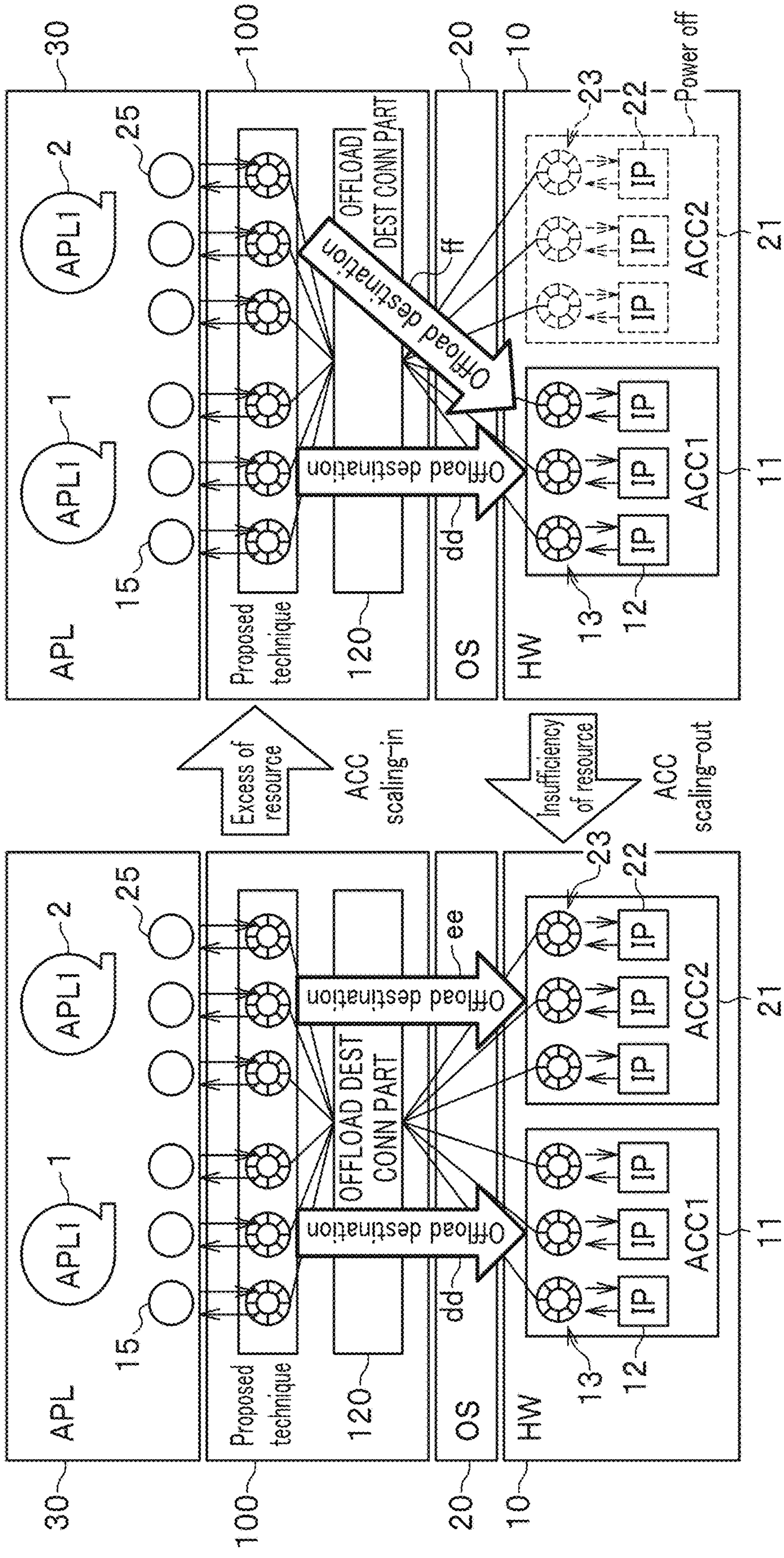
FIG. 8 is an operation explanatory diagram of <excess of resource> and <insufficiency of resource> in the power saving accelerator management system of FIG. 7.

FIG. 8 is an operation explanatory diagram of <excess of resource> and <insufficiency of resource> in the power saving accelerator management system of FIG. 7.

<Requirement 1: Transparency> is satisfied without changing the application by switching the offload destination of a task by device emulation part 110 and offload destination connection part 120.

Regarding a thread of APL 1 illustrated in FIG. 8, the offload destination corresponds to device queue 13 and the thread of APL 1 transmits a request to accelerator 11 (see arrow dd in FIG. 8) and receives a request after the completion of the processing in the poll mode or the interrupt mode. Furthermore, regarding a thread of APL 1, the offload destination corresponds to device queue 23 (see arrow ee in FIG. 8) and the thread of APL 1 transmits a request to accelerator 21 and receives a request after the completion of the processing in the poll mode or the interrupt mode.

In the case of <excess of resource>, offload destination determination part 130 decides to perform ACC scaling-in, and offload destination connection part 120 performs connection switching (see arrow ff in FIG. 8). Furthermore, device control part 150 performs an operation of the ACC power (here, accelerator 21 is powered off). With this, the power saving accelerator management system satisfies <Requirement 2: Power saving property>.

In the case of <insufficiency of resource>, device control part 150 performs an operation of the ACC power, and offload destination determination part 130 decides to perform ACC scaling-out. Furthermore, offload destination connection part 120 performs connection switching. With this, the power saving accelerator management system satisfies <Requirement 3: Performance>.

Incidentally, conventionally, the accelerator resources to/from which transmission/reception is performed by the threads are fixedly allocated at the time of initialization of APLs 1 and 2 on a per device queue 13,23 basis (device queue 13 and accelerator 11 of APL 1 are fixedly allocated; and device queue 23 and accelerator 21 of APL 2 are fixedly allocated), as illustrated in FIG. 27.

In contrast, in the case of the present embodiment, the offload destination accelerator is dynamically changed such that in the case of excess of resource, ACC scaling-in; and in the case of insufficiency of resource, ACC scaling-out, as illustrated in FIG. 8. That is, the accelerator at the changed destination is shared.

<ACC Scaling-in in Feature <1>>

A description will be given of the ACC scaling-in in Feature <1> with reference to the control sequence of FIG. 9 and the flowchart of FIG. 10.

Figure 9:
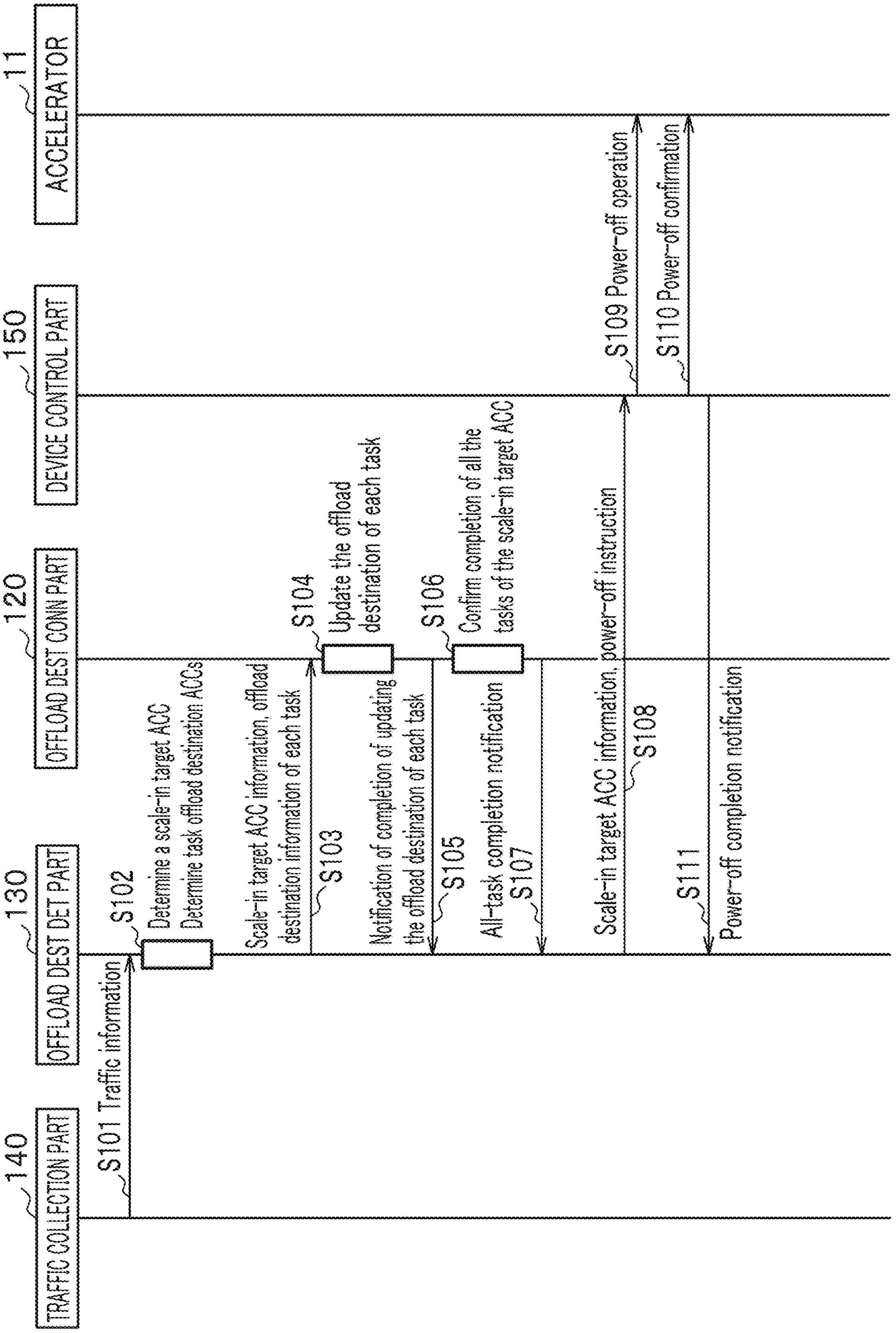
FIG. 9 is a control sequence describing ACC scaling-in in Feature <1> of the power saving accelerator management system according to the embodiment of the present invention.

FIG. 9 is a control sequence for describing the ACC scaling-in in Feature <1>.

Traffic collection part 140 collects the traffic of each ACC and notifies offload destination determination part 130 of the traffic information (step S101).

Offload destination determination part 130 determines, based on the traffic information on each ACC, a scale-in target ACC (ACC to be powered off) and a new offload destination ACC of the task being offloaded to the ACC (step S102). Note that the flowchart of the ACC scaling-in will be described below with reference to FIG. 10.

Offload destination determination part 130 notifies (step S103) offload destination connection part 120 of scale-in target ACC information and the offload destination information of each task.

Offload destination connection part 120 updates (step S104) the offload destination of each task (device mapping table 201 (FIG. 2)) based on the offload destination information of each task and notifies (step S105) offload destination determination part 130 of update completion.

Offload destination connection part 120 confirms (step S106) processing completion of all the tasks of the scale-in target ACC. Offload destination connection part 120, after the completion, makes a notification of all-task completion (step S107) to offload destination determination part 130.

Offload destination determination part 130 notifies (step S108) device control part 150 of the scale-in target ACC information and power-off for the pertinent ACC.

Device control part 150 performs (step S109) a power-off operation on the pertinent ACC (accelerator 11) based on the scale-in target ACC information.

Device control part 150 confirms (step S110) the power state of the pertinent ACC until the power-off is verified. Once the power-off is confirmed, device control part 150 updates device management table 205 (FIG. 6) and notifies (step S111) offload destination determination part 130 of the power-off completion.

Figure 10:
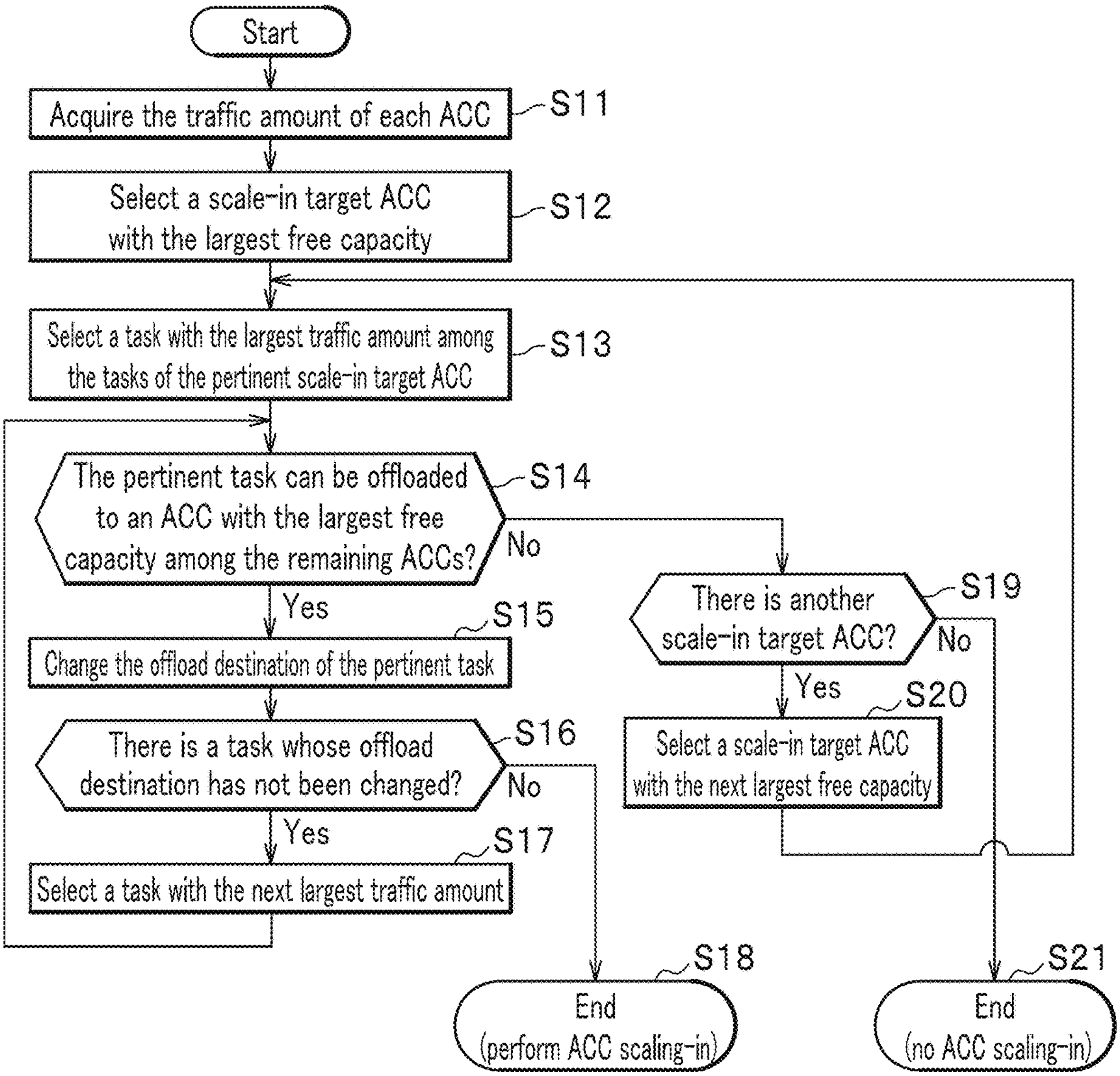
FIG. 10 is a diagram illustrating a flowchart of ACC scaling-in of an offload destination determination part in the control sequence of FIG. 9.

FIG. 10 is a diagram illustrating a flowchart of the ACC scaling-in by offload destination determination part 130 in the control sequence of FIG. 9.

In step S11, traffic collection part 140 acquires the traffic amount of each ACC.

In step S12, offload destination determination part 130 selects a scale-in target ACC with the largest free capacity. That is, it is assumed that the ACC with the largest free capacity is easily scaled in.

Here, the free capacity of the ACC is calculated by subtracting a total traffic amount of the tasks from the maximum traffic amount in a state where the performance of APLs 1 and 2 is satisfied.

Note that physical capacities such as the number of offload tasks, a power margin, and a temperature margin may be used instead of or in combination with the ACC free capacity.

In step S13, offload destination determination part 130 selects a task with the largest traffic amount among the tasks of the pertinent scale-in target ACC.

In step S14, offload destination determination part 130 determines whether the pertinent task can be offloaded to an ACC with the largest free capacity among the remaining ACCs.

When offloading to the ACC with the largest free capacity is not possible (S14: No), the processing proceeds to step S19.

When offloading to the ACC with the largest free capacity is possible (S14: Yes), in step S15, offload destination determination part 130 changes the offload destination of the pertinent task.

In step S16, offload destination determination part 130 determines whether there is a task whose offload destination has not been changed.

When there is a task whose offload destination has not been changed (S16: Yes), in step S17, offload destination determination part 130 selects a task with the next largest traffic amount and returns to step S14.

When there is no task whose offload destination has not been changed (S16: No), ACC scaling-in is performed and the processing of the present flow is finished (step S18).

On the other hand, in step S14, when offloading to the ACC with the largest free capacity is not possible (S14: No), in step S19, offload destination determination part 130 determines whether there is another scale-in target ACC.

When there is another scale-in target ACC (S19: Yes), in step S20, offload destination determination part 130 selects the scale-in target ACC with the next largest free capacity and returns to step S13.

When there is no other scale-in target ACC (S19: No), the processing of the present flow is finished (no ACC scaling-in) (step S21).

Figure 11:
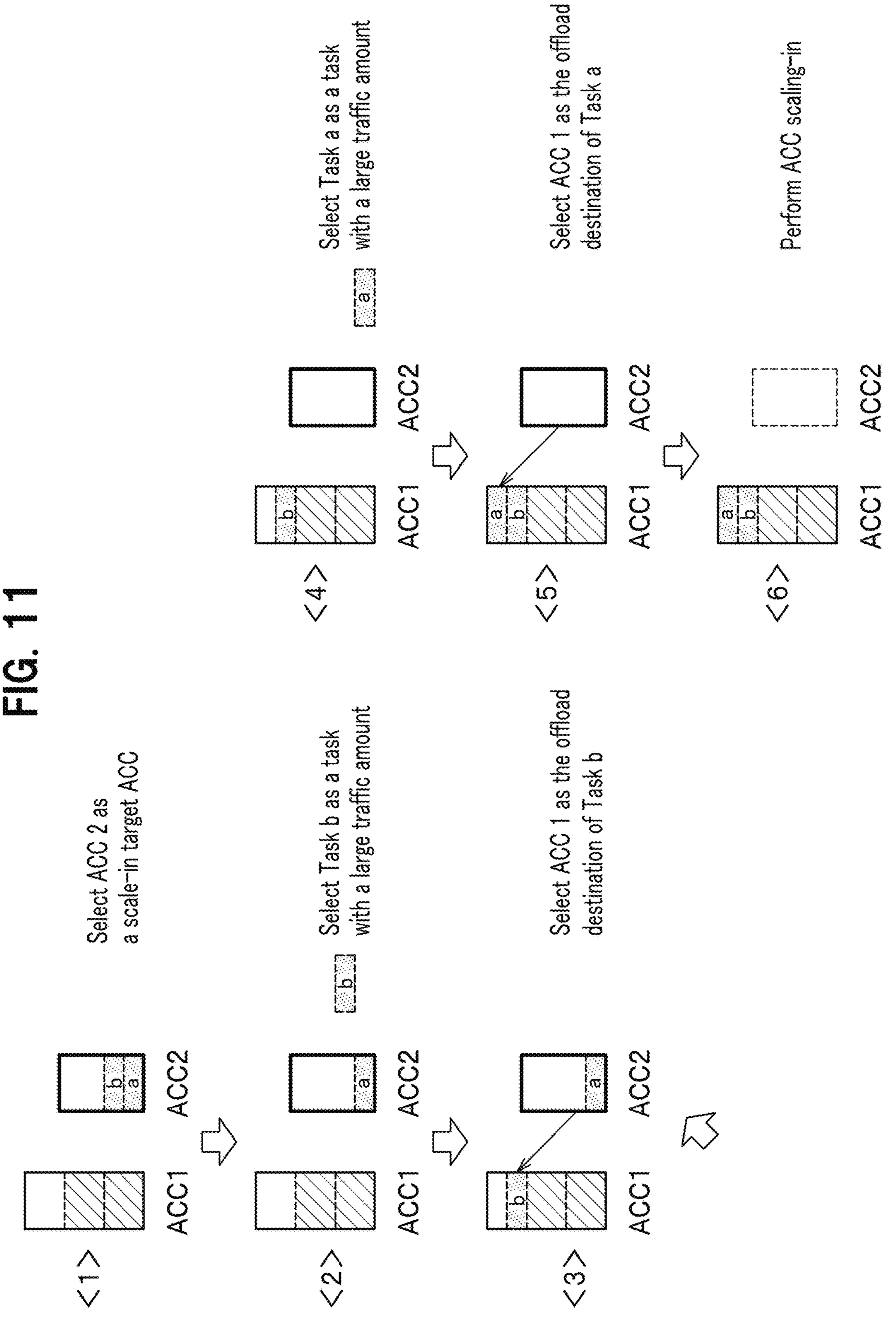
FIG. 11 is a diagram schematically illustrating ACC scaling-in when a scale-in target ACC of the power saving accelerator management system according to the embodiment of the present invention is ACC 2.

FIG. 11 is a diagram schematically illustrating ACC scaling-in when the scale-in target ACC is ACC 2. The thin solid blocks in FIG. 11 indicate the allowable traffic of ACC 1, and the thick solid blocks in FIG. 11 indicate the allowable traffic of ACC 2. In FIG. 11, the allowable traffic (free capacity) of ACC 1 is larger than the allowable traffic (free capacity) of ACC 2 and is represented by the size of the block. Furthermore, the hatching in FIG. 11 indicates the ACC traffic.

FIG. 11 <1>

Each of the allowable traffics of ACC 1 and ACC 2 accommodates the ACC traffic.

Note that the allowable traffic of ACC 1 is larger than that of ACC 2. The ACC that is easily scaled in is an ACC with a large free capacity. In view of this, ACC 2 is selected as a scale-in target ACC.

FIG. 11 <2>

Task b is selected from ACC 2 as a task with a large traffic amount.

FIG. 11 <3>

ACC 1 is selected as the offload destination of Task b of ACC 2. In FIG. 11 <3>, Task b is offloaded to ACC 1.

FIG. 11 <4>

Next, Task a is selected from ACC 2 as a task with a large traffic amount.

FIG. 11 <5>

ACC 1 is selected as the offload destination of Task a of ACC 2. In FIG. 11 <5>, Task a is offloaded to ACC 1 in addition to task b. In this state, the allowable traffic of ACC 1 does not have enough free capacity to accept a new task.

FIG. 11 <6>

As the tasks of ACC 2 have all been transferred, ACC 2 becomes to be able to be scaled in. ACC scaling-in is performed. Here, the ACC scaling-in means powering-off ACC 2 (power-off is indicated by the dashed boxes).

<ACC Scale-in Derivative in Feature <1>>

In FIGS. 9 to 11, the scaling-in involving powering-off has been described.

Instead of the scaling-in involving powering-off, the following form can also be adopted. •When an ACC is able to save power by a degenerated operation, the offload destination of a task in an excess of the performance of the degenerated operation of the pertinent ACC is changed and then the ACC degenerated operation is performed.

Figure 12:
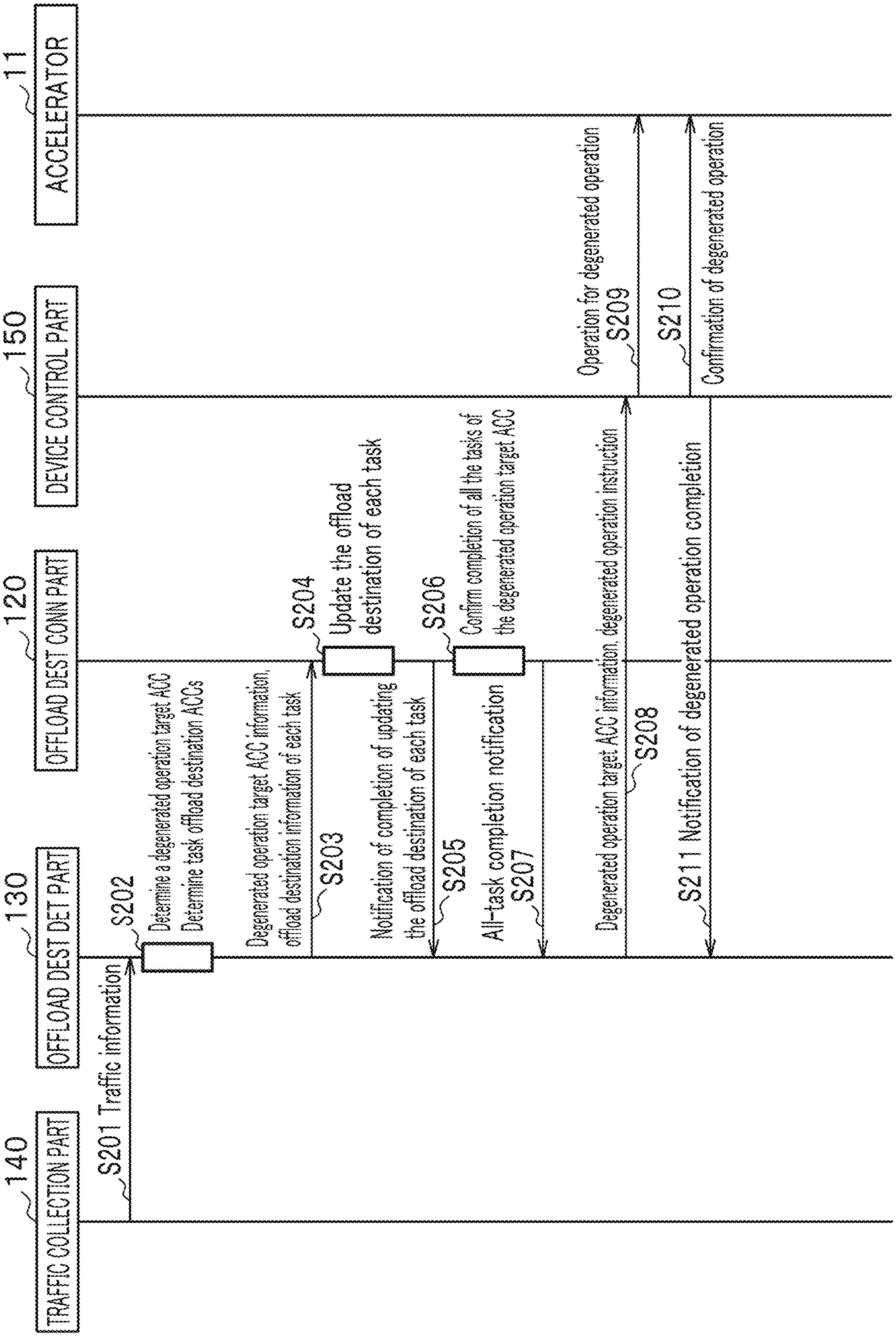
FIG. 12 is a control sequence of <ACC scale-in derivative in Feature <1>> of the power saving accelerator management system according to the embodiment of the present invention.

Example (1): Reduction in the number of IP cores in an FPGA and power control on a per IP core basis Example (2): Circuit scale reduction by dynamic reconfiguration in an FPGA Example (3): Decrease the voltage in an ACC Example (4): Decrease the clock frequency of an ACC FIG. 12 is a control sequence of <ACC scale-in derivative in <Feature <1>>. FIG. 12 corresponds to the control sequence of the <ACC scaling-in in Feature <1>> in FIG. 9.

Traffic collection part 140 collects the traffic of each ACC and notifies (step S201) offload destination determination part 130 of the traffic information.

Offload destination determination part 130 determines (step S202), based on the traffic information on each ACC, a degenerated operation target ACC and a new offload destination ACC(s) of a task(s) currently being offloaded to the degenerated operation target ACC.

Offload destination determination part 130 notifies (step S203) offload destination connection part 120 of information on the degenerated operation target ACC and information on the offload destination of each task.

Offload destination connection part 120 updates (step S204) the offload destination of each task (device mapping table 201 (FIG. 2)) based on the information on the offload destination of each task and notifies (step S205) offload destination determination part 130 of update completion.

Offload destination connection part 120 confirms (step S206) processing completion of all the tasks of the degenerated operation target ACC. Offload destination connection part 120, after completion, makes a notification (step S207) of all-task completion to offload destination determination part 130.

Offload destination determination part 130 notifies (step S208) device control part 150 of the degenerated operation target ACC information and the degenerated operation for the pertinent ACC.

Device control part 150, based on the degenerated operation target ACC information, performs (step S209) an operation for the degenerated operation of the pertinent ACC (accelerator 11).

Device control part 150 checks (step S210) the power state of the pertinent ACC until the degenerated operation is confirmed. Once the degenerated operation is confirmed, device control part 150 updates device management table 205 (FIG. 6) and notifies (step S211) offload destination determination part 130 of completion of the degenerated operation.

The <ACC scaling-in in <Feature <1>> has been described. Next, the <ACC scaling-out in <Feature <1>> will be described.

<ACC Scaling-Out in Feature <1>>

The ACC scaling-out in Feature <1> will be described with reference to the control sequence of FIG. 13 and the flowchart of FIG. 14.

Figure 13:
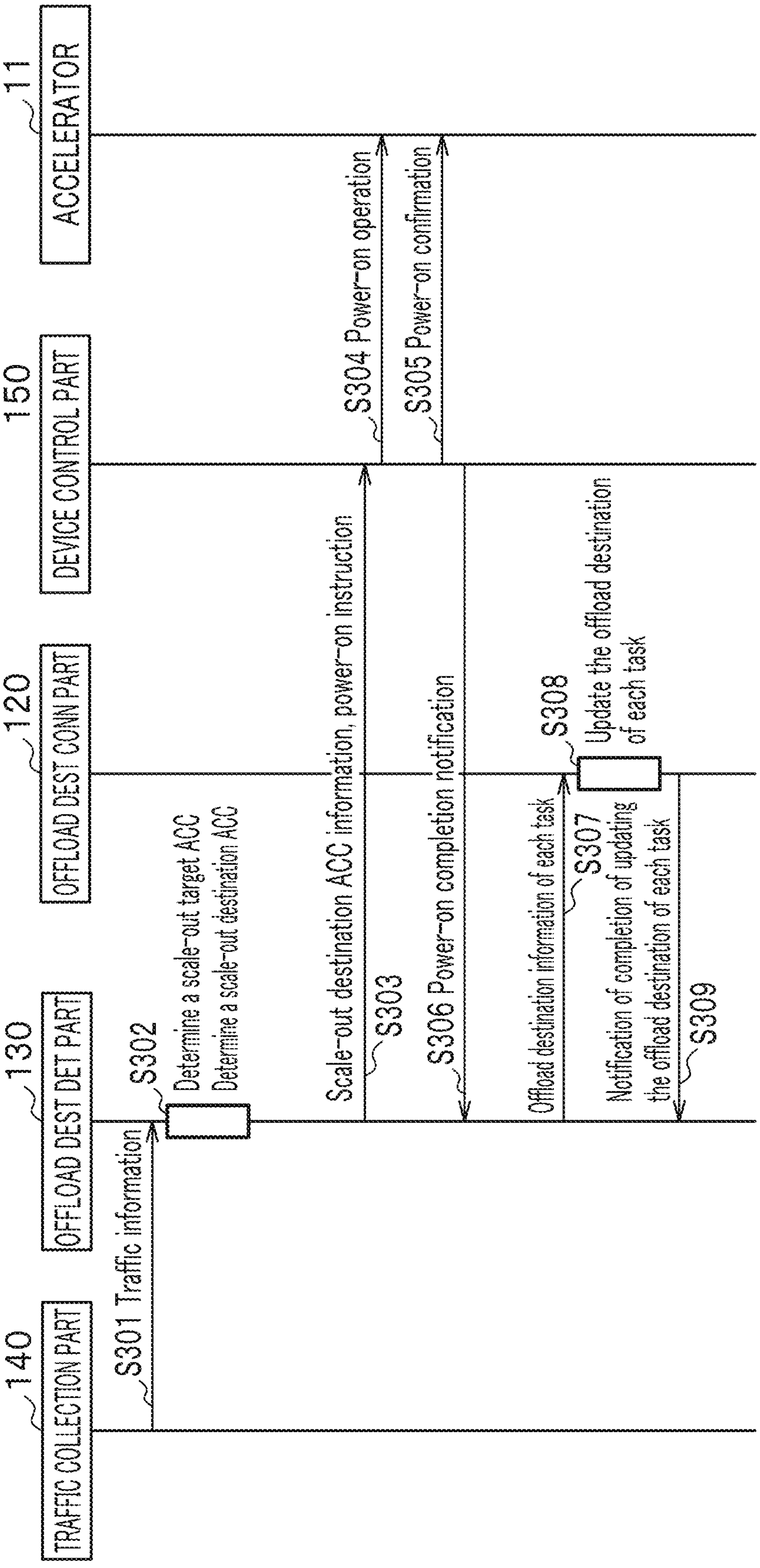
FIG. 13 is a control sequence for describing ACC scaling-out in Feature <1> of the power saving accelerator management system according to the embodiment of the present invention.

FIG. 13 is a control sequence for describing the ACC scaling-out in Feature <1>.

Traffic collection part 140 collects the traffic of each ACC and notifies offload destination determination part 130 of the traffic information (step S301).

Offload destination determination part 130 determines (step S302), based on the traffic information on each ACC, a scale-out target ACC (a part of the tasks currently being offloaded to the pertinent ACC is offloaded to a new offload destination) and a new offload destination ACC of the task currently being offloaded to the pertinent ACC. Note that a flowchart of ACC scaling-out will be described below with reference to FIG. 14.

Offload destination determination part 130 notifies (step S303) device control part 150 of scale-out destination ACC information and a power-on instruction.

Device control part 150 performs (step S304) a power-on operation to the pertinent ACC based on the scale-out destination ACC information.

Device control part 150 checks (step S305) the power state of the pertinent ACC until the power-on has been confirmed. Once the power-on is confirmed, device control part 150 updates device management table 205 (FIG. 6) and notifies (step S306) offload destination determination part 130 of power-on completion.

Offload destination determination part 130 notifies (step S307) offload destination connection part 120 of information on the offload destination of each task.

Offload destination connection part 120, based on the information on the offload destination of each task, updates (step S308) the offload destination of each task, and notifies (step S309) offload destination determination part 130 of update completion.

Figure 14:
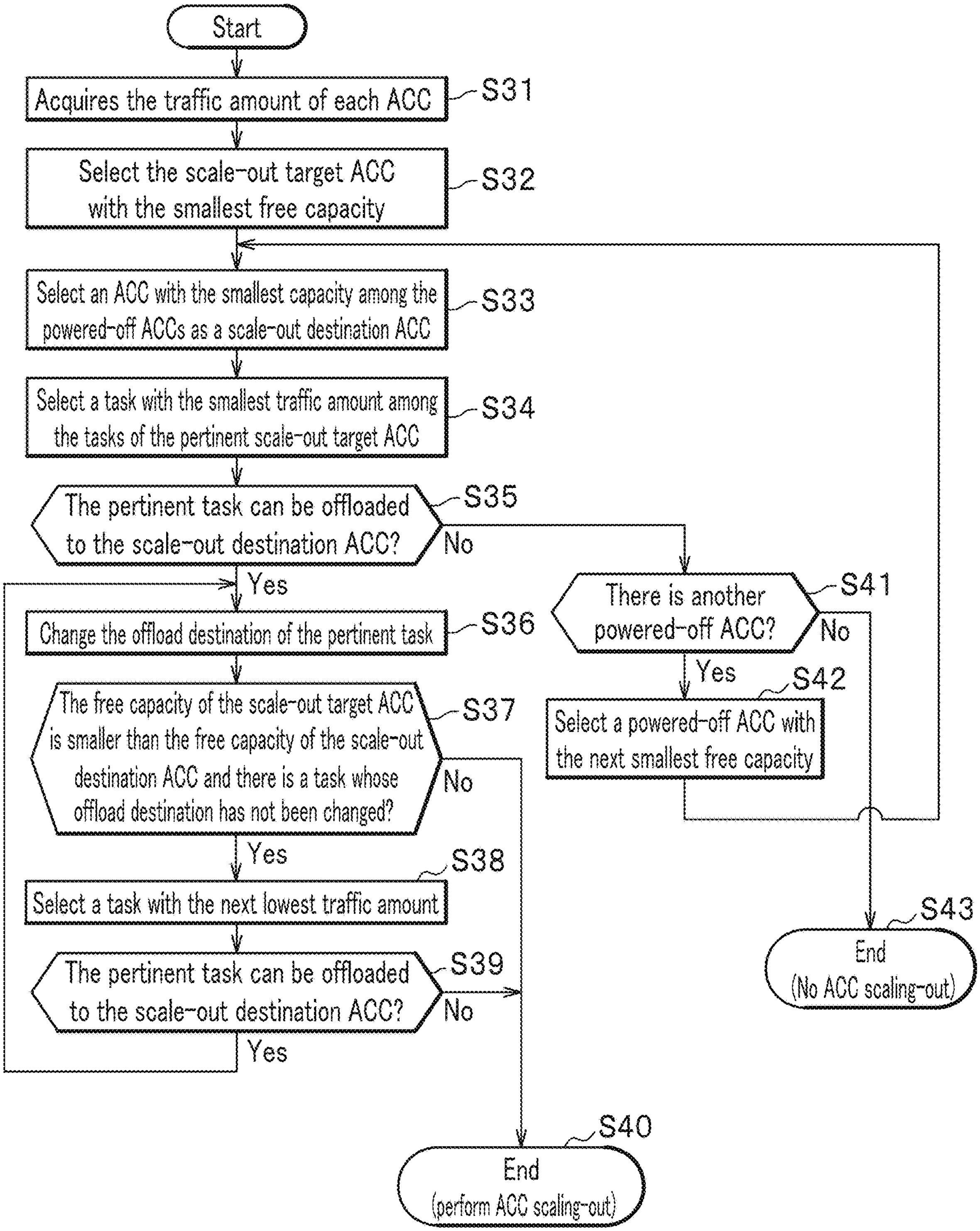
FIG. 14 is a diagram illustrating a flowchart of ACC scaling-out of the offload destination determination part in the control sequence of FIG. 13.

FIG. 14 is a diagram illustrating a flowchart of the ACC scaling-out of offload destination determination part 130 in the control sequence of FIG. 13.

In step S31, traffic collection part 140 acquires the traffic amount of each ACC.

In step S32, offload destination determination part 130 selects the scale-out target ACC with the smallest free capacity.

Here, the free capacity of the ACC is calculated by subtracting a total traffic amount of the tasks from the maximum traffic amount in a state where the performance of APLs 1 and 2 is satisfied. Physical capacities such as the number of offload tasks, a power margin, and a temperature margin may be used instead of or in combination with the ACC free capacity.

In step S33, offload destination determination part 130 selects an ACC with the smallest capacity among the powered-off ACCs as a scale-out destination ACC.

In step S35, offload destination determination part 130 determines whether a pertinent task can be offloaded to the scale-out destination ACC. When the pertinent task cannot be offloaded to the scale-out destination ACC (S35: No), the processing proceeds to step S41.

When the pertinent task can be offloaded to the scale-out destination ACC (S35: Yes), in step S36, offload destination determination part 130 changes the offload destination of the pertinent task In step S37, determination is made as to whether the free capacity of the scale-out target ACC is smaller than the free capacity of the scale-out destination ACC and there is a task whose offload destination has not been changed.

When the free capacity of the scale-out target ACC is smaller than the free capacity of the scale-out destination ACC and there is a task whose offload destination has not been changed (S37: Yes), in step S38, a task with the next lowest traffic amount is selected.

In step S39, determination is made as to whether a pertinent task can be offloaded to the scale-out destination ACC.

When the pertinent task can be offloaded to the scale-out destination ACC (S39: Yes), the processing returns to above-described step S36. That is, if still offloading is possible, the step of ACC scaling-out is repeated.

When, in above-described step S37, the free capacity of the scale-out target ACC is greater than or equal to the free capacity of the scale-out destination ACC or there is no task whose offload destination has not been changed (S37: No), or when, in above-described step S39, the pertinent task cannot be offloaded to the scale-out destination ACC (S39: No), the ACC scaling-out is performed and the processing of the present flow is finished (step S40).

On the other hand, in step S35, when the pertinent task cannot be offloaded to the scale-out destination ACC (S35: No), in step S41, determination is made as to whether there is another powered-off ACC.

When there is another powered-off ACC (S41: Yes), in step S42, offload destination determination part 130 selects a powered-off ACC with the next smallest free capacity and the processing returns to above-described step S33.

When there is no other powered-off ACC (S41: No), the processing of the present flow is finished (no ACC scaling-out) (step S43).

Figure 15:
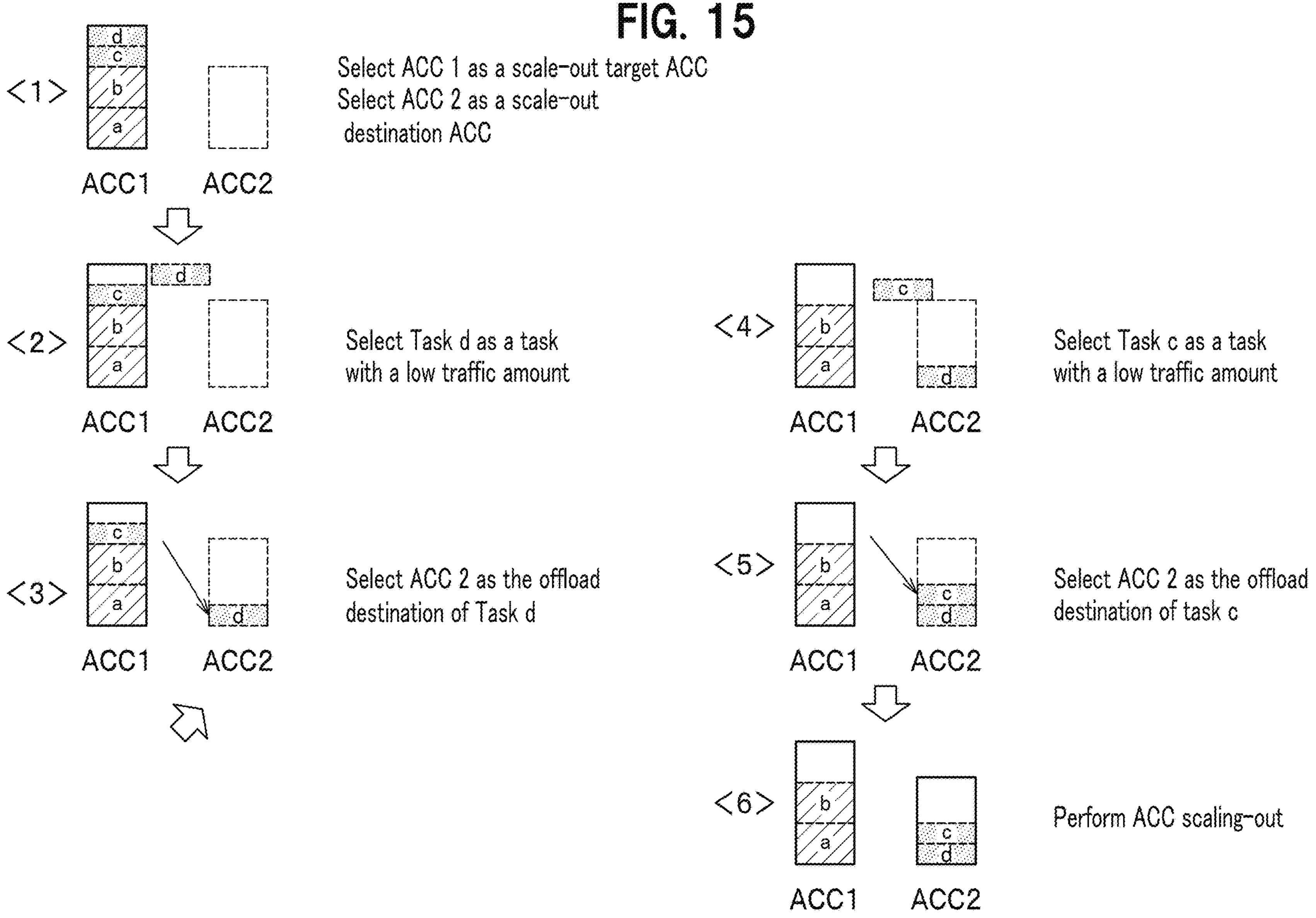
FIG. 15 is a diagram schematically illustrating ACC scaling-out when the scale-out target ACC of the power saving accelerator management system according to the embodiment of the present invention is ACC 1.

FIG. 15 is a diagram schematically illustrating the ACC scaling-out when the scale-out target ACC is ACC 1. The thin dashed blocks in FIG. 15 indicate the allowable traffic of ACC 2, and the thin solid blocks in FIG. 15 indicate the allowable traffic of ACC 1. In FIG. 15, the allowable traffic (free capacity) of ACC 1 is larger than the allowable traffic (free capacity) of ACC 2, and is represented by the size of the block. Further, the hatching in FIG. 15 indicates the ACC traffic. Further, power-off is indicated by the dashed boxes.

FIG. 15 <1>

In ACC 1, tasks a, b, c, and d are accommodated as the traffic amounts. ACC 2 is powered off. Therefore, ACC 1 is selected as a scale-out target ACC, and ACC 2 is selected as a scale-out destination ACC.

FIG. 15 <2>

Task d is selected from ACC 2 as a task with a low traffic amount.

FIG. 15 <3>

ACC 2 is selected as the offload destination of Task d. In FIG. 15 <3>, Task d is offloaded to ACC 2.

FIG. 15 <4>

Next, Task c is selected from ACC 1 as a task with a low traffic amount.

FIG. 15 <5>

ACC 2 is selected as the offload destination of task c. In FIG. 15 <5>, offloading is performed to add Task c to ACC 2 in addition to task d.

FIG. 15 <6>

When the next task is attempted to be offloaded, as step S39 in FIG. 14 results negative and the processing proceeds to execution of scale-out, the scale-out becomes executable for ACC 2. ACC scaling-out is performed.

<ACC Scale-Out Derivative in Feature <1>>

A description has been given of the scaling-out involving powering-on with reference to FIGS. 13 to 15.

The following form, rather than the scaling-out involving powering-on, can also be adopted. When an ACC is able to improve the performance by canceling a degenerated operation, the offload destination of a task that can be covered by the cancellation of the degenerated operation of the pertinent ACC is changed to the pertinent ACC and then the ACC degenerated operation is canceled.

Example (1): Increase the number of IP cores in an FPGA and power control on a per IP core basis Example (2): Enlarge the circuit scale by dynamic reconfiguration in an FPGA Example (3): Increase the voltage in an ACC Example (4): Increase the clock frequency in the ACC Hereinabove, the <ACC scaling-out in <Feature <1>> has been described.

Figure 16:
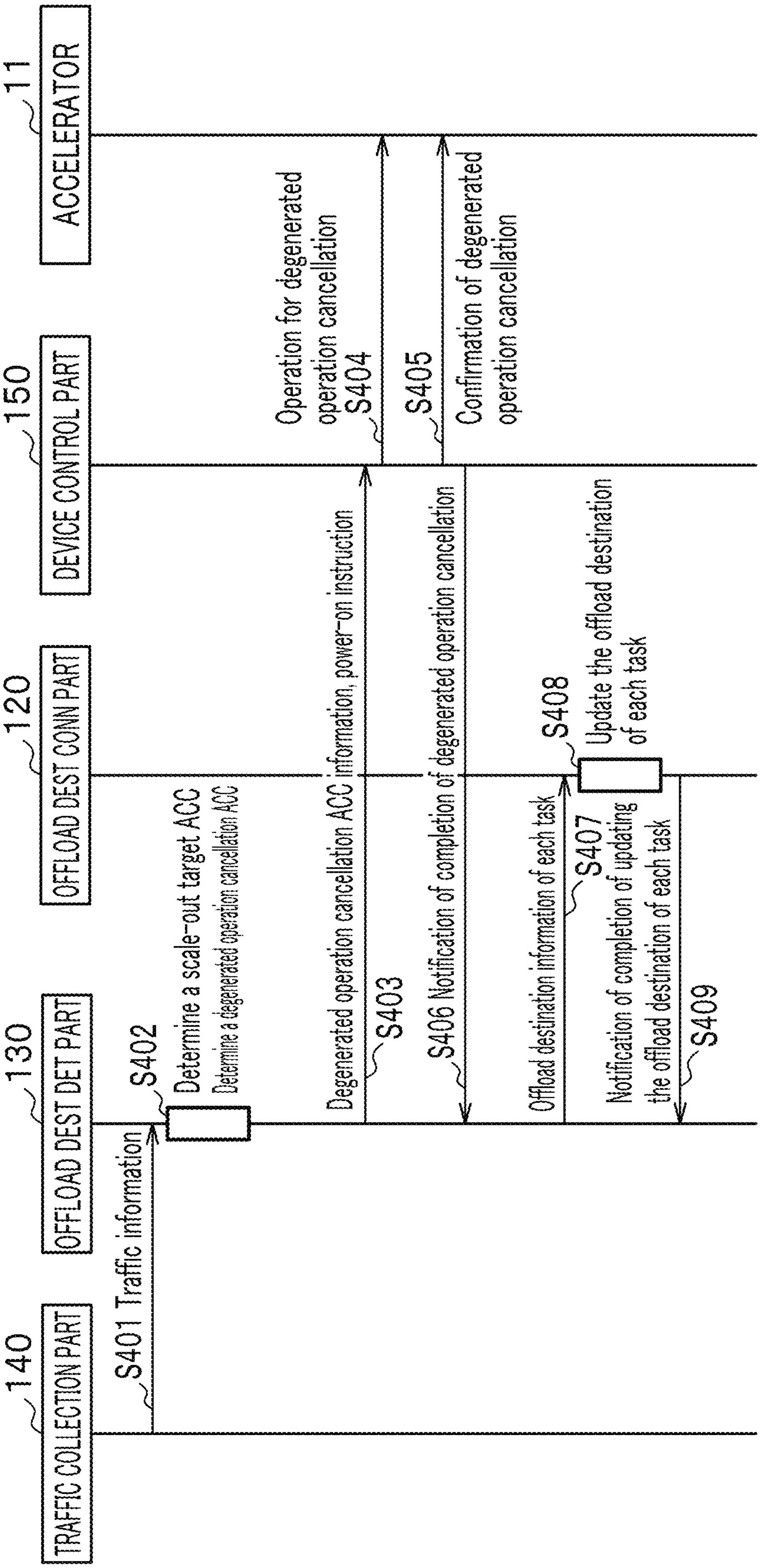
FIG. 16 is a control sequence of <ACC scale-out derivative in Feature <1>> of the power saving accelerator management system according to the embodiment of the present invention.

FIG. 16 is a control sequence of <ACC scale-out derivative in <Feature <1>>.

Traffic collection part 140 collects the traffic of each ACC and notifies (step S401) offload destination determination part 130 of the traffic information.

Offload destination determination part 130 determines (step S402) the scale-out target ACC and the degenerated operation cancellation ACC.

Offload destination determination part 130 communicates (step S403) device control part 150 with degenerated operation cancellation ACC information and a power-on instruction.

Device control part 150 performs (step S404) a degenerated operation cancellation operation on accelerator 11 and confirms degenerated operation cancellation.

Device control part 150 performs (step S405) confirmation on accelerator 11 about the degenerated operation cancellation.

Device control part 150 notifies (step S406) offload destination connection part 120 of completion of the degenerated operation cancellation.

Offload destination determination part 130 notifies (step S407) offload destination connection part 120 of information on the offload destination of each task.

Offload destination connection part 120 updates (step S408) information on the offload destination of each task based on the information on the offload destination of each task communicated from offload destination determination part 130.

Offload destination connection part 120 notifies (step S409) offload destination determination part 130 of completion of updating the offload destination of each task.

Hereinabove, the <ACC scale-out derivative in <Feature <1>> has been described.

Reconfiguration of Offload Destinations Taking Into Account Optimum Assignment (Feature <2>)

A description will be given of reconfiguration of the offload destination taking into account the optimum assignment (Feature <2>).

The reconfiguration of the offload destination taking into account the optimum assignment (Feature <2>) attempts power saving and performance improvement that cannot be achieved only by scaling-in/scaling-out of Feature <1> described above.

Figure 17:
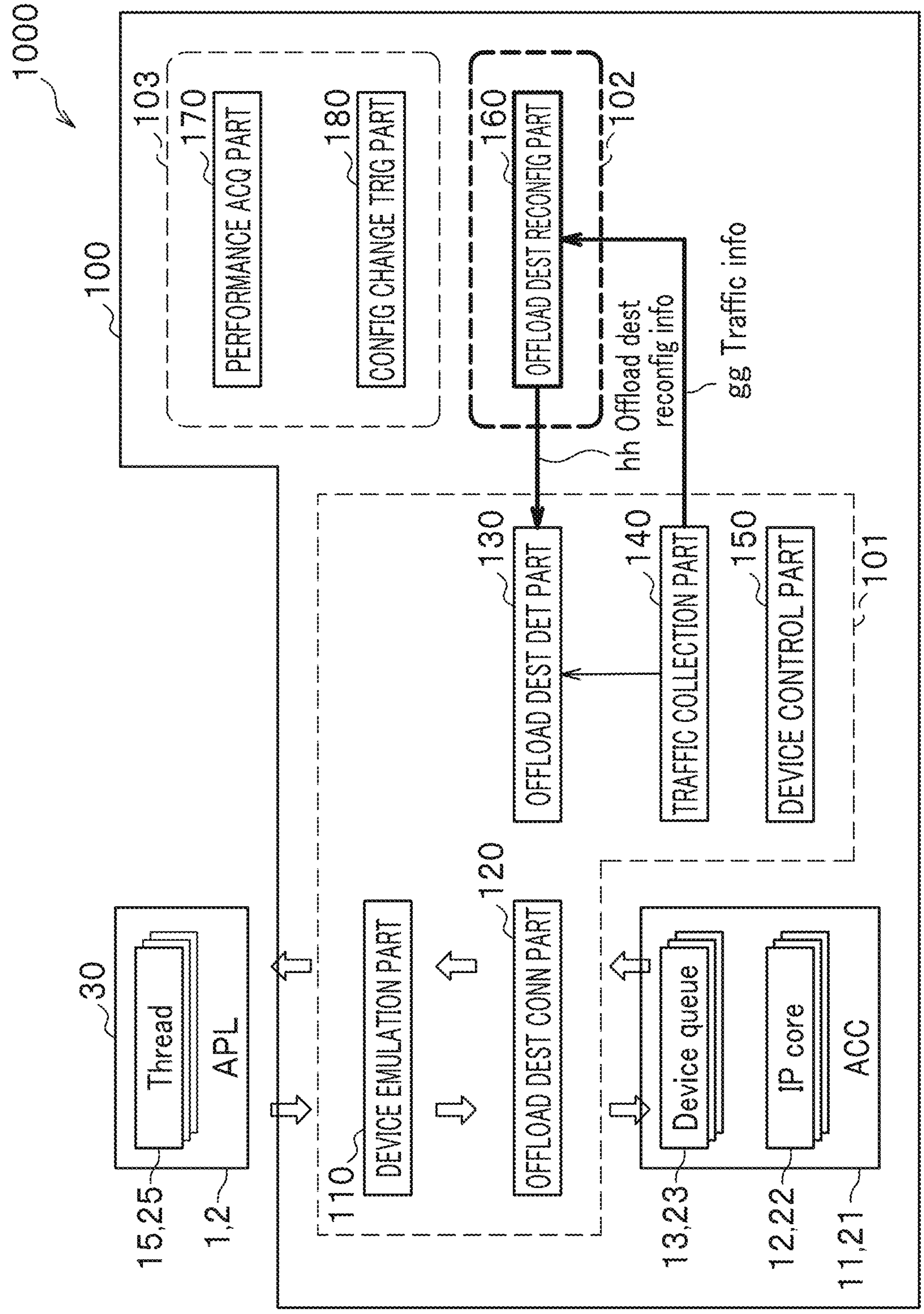
FIG. 17 is an operation explanatory diagram for describing reconfiguration of the offload destination taking into account an optimum assignment (Feature <2>) of the power saving accelerator management system according to the embodiment of the present invention.

FIG. 17 is an operation explanatory diagram of the power saving accelerator management system for describing the reconfiguration of the offload destination taking into account the optimum assignment (Feature <2>). The same components as those in FIG. 1 are denoted by the same reference signs. The functional parts pertinent to the operations described in the following description are represented by thick frames.

The Feature <2> is implemented by offload destination reconfiguration part 102 indicated by a dashed line in FIG. 17, which takes into account the optimum assignment. Specifically, it is described below.

Offload destination reconfiguration part 160, illustrated in FIG. 17, initializes the current offload destinations of each of APLs 1 and 2 based on the traffic information (see reference sign gg) obtained from traffic collection part 140, determines the appropriate offload destinations from scratch, and provides offload destination reconfiguration information (see reference sign hh) to offload destination determination part 130.

The reconfiguration of the offload destination taking into account the optimum assignment (Feature <2>) includes features of <redetermination of power-off ACC> and <task load distribution>.

Figure 18:
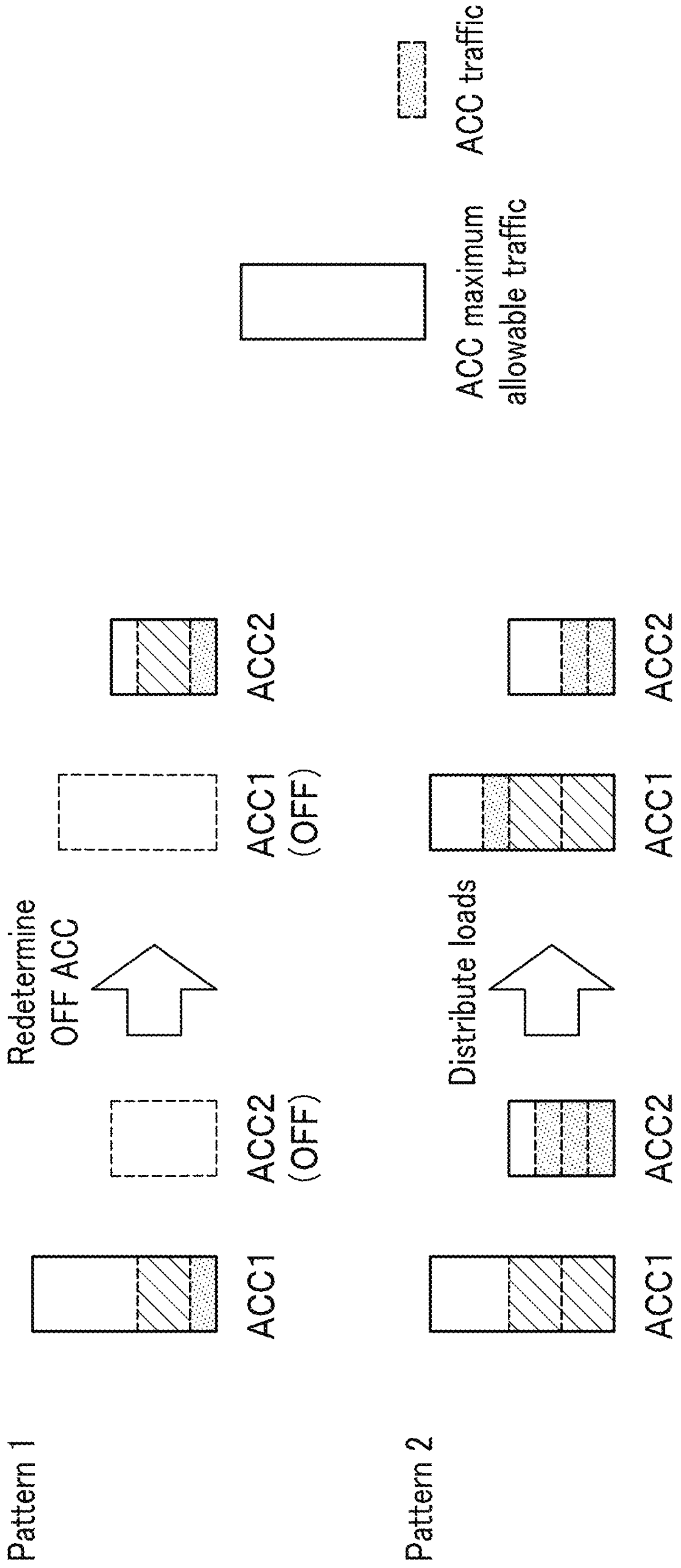
FIG. 18 is an explanatory diagram for describing <redetermination of power-off ACC> and <task load distribution> of Feature of the power saving accelerator management system according to the embodiment of the present invention.

FIG. 18 is an explanatory diagram illustrating <redetermination of power-off ACC> and <task load distribution> of Feature <2>. Pattern 1 of the upper diagram of FIG. 18 illustrates <redetermination of power-off ACC>, and Pattern 2 of the lower diagram of FIG. 18 illustrates <task load distribution>. The solid blocks in FIG. 18 indicate ACC maximum allowable traffic (free capacity), and hatching in FIG. 18 indicates ACC traffic. Furthermore, dashed blocks in FIG. 18 indicate ACC powered off.

<Redetermination of Power-Off ACC>

Offload destination reconfiguration part 160 recalculates offload destinations based on the traffic information acquired by traffic collection part 140. When an ACC whose power is larger than an ACC that has already been powered off through ACC scaling-in can be powered off, offload destination reconfiguration part 160 provides offload destination reconfiguration information to offload destination determination part 130 to modify the offload destination of a task to the pertinent ACC. Offload destination determination part 130, upon reception of this provision, modifies the offload destination of the task. Device control part 150 contributes to <Requirement 2: Power saving property> by powering off the ACC whose power is large.

For example, in Pattern 1 of the upper diagram of FIG. 18, ACC 2 has been powered off through ACC scaling-in. ACC 1 has a larger ACC maximum allowable traffic (free capacity) than ACC 2. Therefore, power saving can be further achieved by powering off ACC 1 through ACC scaling-in.

The offload destination is recalculated based on the traffic information acquired by traffic collection part 140 to reconfigure the offload destination. In this case, all the ACC traffic (tasks) of ACC 1 are transferred to ACC 2. Then, as indicated by the outlined arrow in the upper diagram of FIG. 18, ACC 1 is powered off through ACC scaling-in by redetermining a power-off ACC.

<Task Load Distribution>

Traffic collection part 140 recalculates the offload destination based on the acquired traffic information. When it is possible to perform task load distribution for each minimum required ACC, Traffic collection part 140 provides the offload destination reconfiguration information to offload destination determination part 130 to modify the offload destinations of the tasks. Offload destination determination part 130, upon reception of this provision, modifies the offload destinations of the tasks. Distributing the loads of the tasks reduces the risk that leads to performance deterioration due to the increase of traffic, contributing to <Requirement 3: Performance>.

For example, in Pattern 2 of the lower diagram of FIG. 18, ACC 1 has larger ACC maximum allowable traffic (free capacity) than ACC 2. However, the ACC traffic (task) is almost the same between ACC 1 and ACC 2. Therefore, there is a margin in the free capacity of ACC 1. When the traffic rises in this state, there is no free capacity in ACC 2 and thus there is a possibility that the request cannot be processed in a waiting time or is lost, leading to the performance deterioration. Therefore, as indicated by the outlined arrow in the lower diagram of FIG. 18, by performing load distribution of transferring a part of the tasks of ACC 2 to ACC 1, the risk leading to the performance deterioration when the traffic increases is reduced.

<Feature <2>: Reconfiguration of Offload Destinations Taking Into Account Optimum Assignment>

Reconfiguration of offload destinations taking into account the optimum assignment in Feature <2> will be described with reference to the control sequence in FIG. 19 and the flowchart in FIG. 20.

Figure 19:
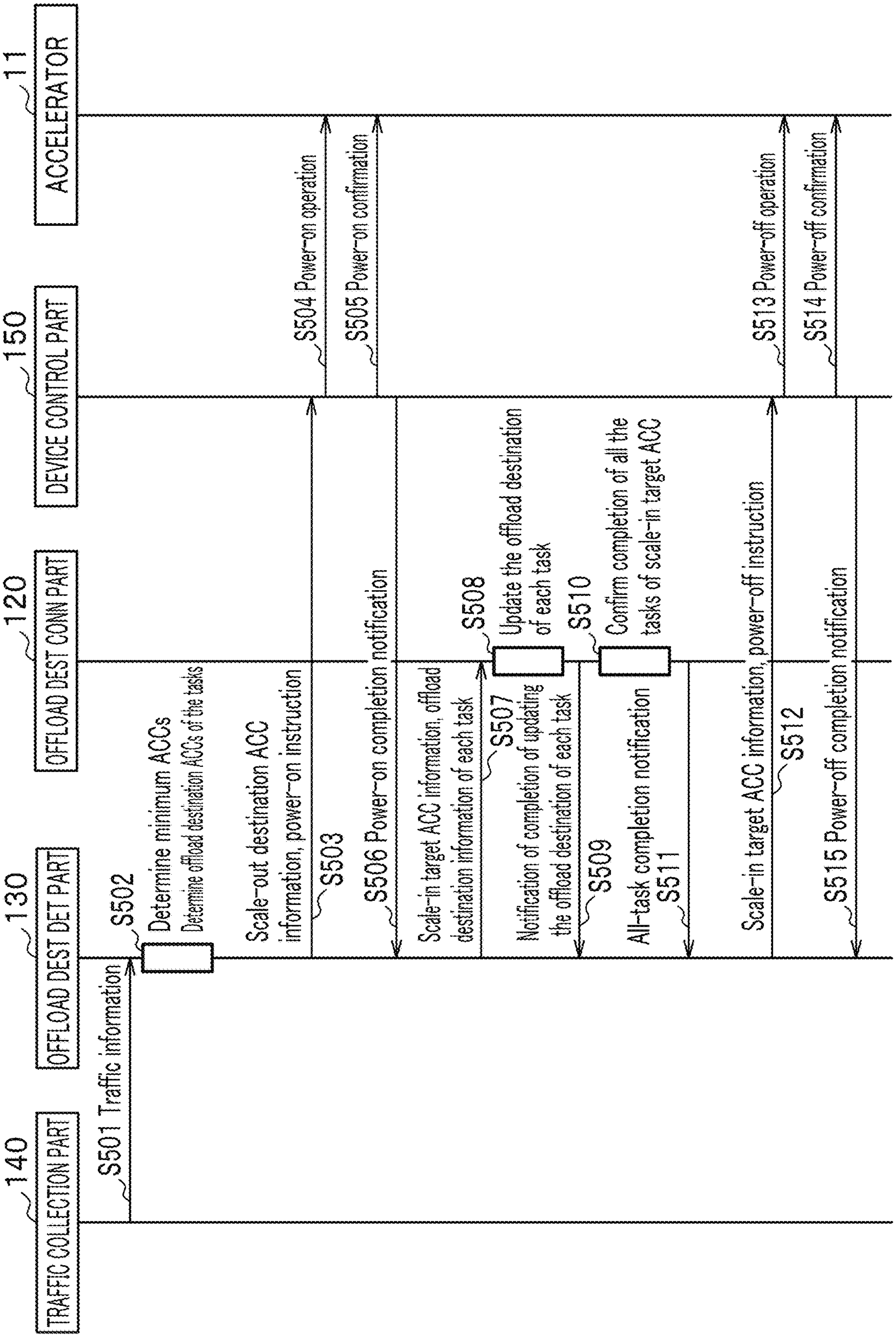
FIG. 19 is a control sequence describing reconfiguration of the offload destination taking into account the optimum assignment in Feature <2> of the power saving accelerator management system according to the embodiment of the present invention.

FIG. 19 is a control sequence for describing the reconfiguration of offload destinations taking into account the optimum assignment in Feature <2>.

The offload destination reconfiguration takes the form of a combination of ACC scaling-in and ACC scaling-out after determining initial minimum ACCs and determining the offload destination ACC of each task.

Traffic collection part 140 collects the traffic of each ACC and notifies (step S501) offload destination determination part 130 of the traffic information.

Offload destination determination part 130 determines (step S502) the minimum ACCs and the offload destination ACCs of the tasks.

Offload destination determination part 130 notifies (step S503) device control part 150 of scale-out destination ACC information and instructs (step S503) device control part 150 to perform powering-on.

Device control part 150 performs an operation of powering-on on accelerator 11 and confirms (step S504) power-on.

Device control part 150 notifies offload destination determination part 130 of power-on completion (step S506).

Offload destination determination part 130 notifies (step S507) offload destination connection part 120 of the scale-in target ACC information and information on the offload destination of each task.

Offload destination connection part 120 updates (step S508) the information on the offload destination of each task based on the information on the offload destination of each task communicated from offload destination determination part 130.

Offload destination connection part 120 notifies (step S509) offload destination determination part 130 of completion of updating the offload destination of each task.

Offload destination connection part 120 confirms (step S510) completion of all the tasks of the scale-in target ACC.

Offload destination connection part 120 notifies offload destination determination part 130 of all-task completion (step S511).

Offload destination determination part 130 notifies (step S512) device control part 150 of the scale-in target ACC information and instructs (step S512) device control part 150 to perform power-off.

Device control part 150 performs an operation of powering-off on accelerator 11 (step S513) and confirms (step S514) power-off.

Device control part 150 notifies (step S515) offload destination determination part 130 of power-off completion.

Figure 20:
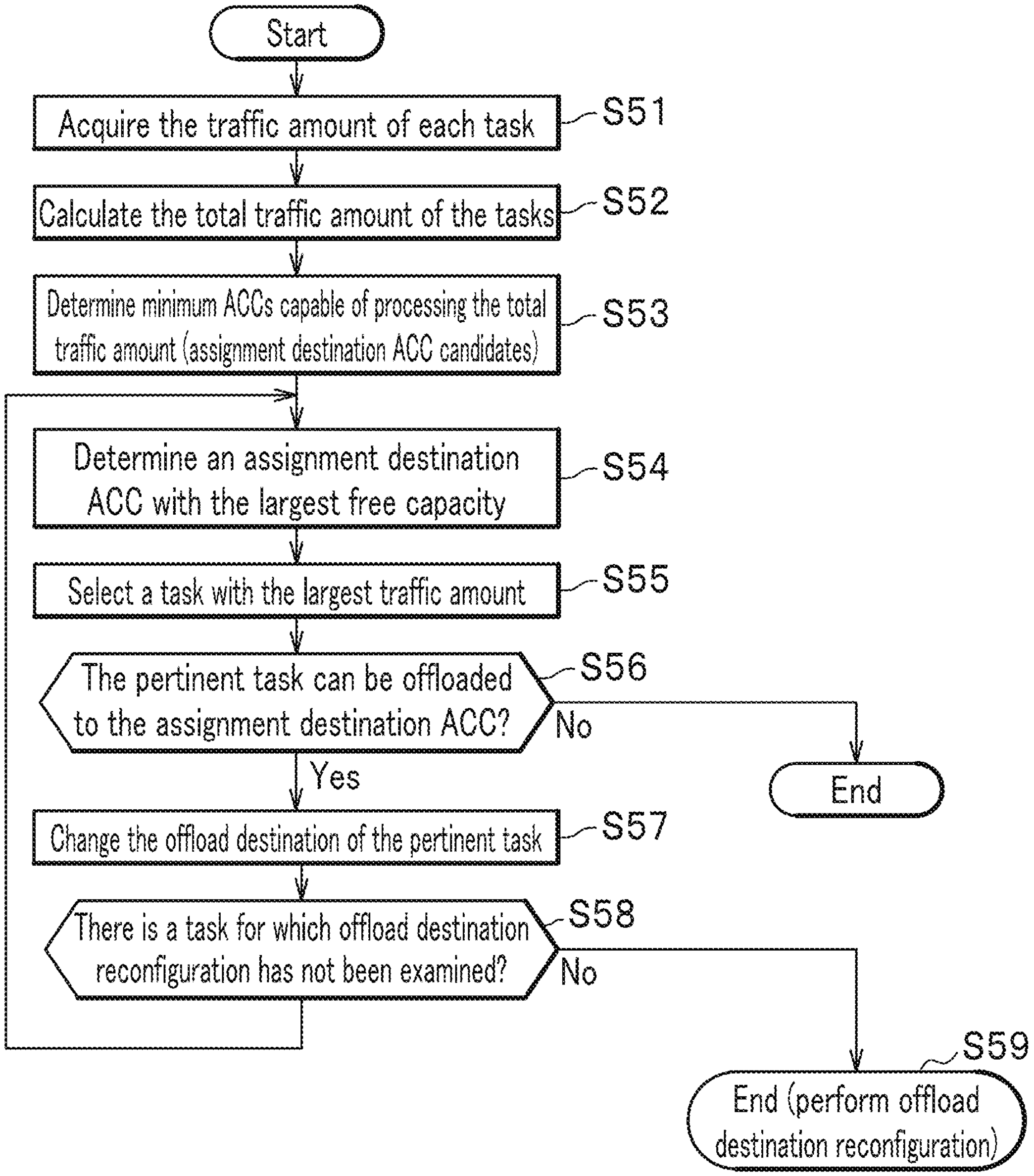
FIG. 20 is a diagram illustrating a flowchart of reconfiguration of the offload destination taking into account the optimum assignment by the offload destination determination part in the control sequence of FIG. 19.

FIG. 20 is a diagram illustrating a flowchart of reconfiguration of the offload destinations taking into account the optimum assignment of offload destination determination part 130 in the control sequence of FIG. 19.

In step S51, traffic collection part 140 acquires the traffic amount of each task.

In step S52, offload destination determination part 130 calculates the total traffic amount of the tasks.

In step S53, offload destination determination part 130 determines the minimum ACCs capable of processing the total traffic amount as assignment destination ACC candidates.

In step S54, offload destination determination part 130 determines an assignment destination ACC with the largest free capacity.

In step S55, offload destination determination part 130 selects a task with the largest traffic amount.

In step S56, offload destination determination part 130 determines whether the pertinent task can be offloaded to the assignment destination ACC. When the pertinent task cannot be offloaded to the assignment destination ACC (S56: No), the processing of the present flow is finished.

When the pertinent task can be offloaded to the assignment destination ACC (S56: Yes), in step S57, offload destination determination part 130 changes the offload destination of the pertinent task.

In step S58, offload destination determination part 130 determines whether there is a task for which offload destination reconfiguration has not been examined.

When there is a task for which offload destination reconfiguration has not been examined (S58: Yes), the processing returns to above-described step S54; and when there is no task for which the offload destination reconfiguration has not been examined (S58: No), in step S59, offload destination reconfiguration is performed and the processing of the present flow is finished.

<Determination of Minimum ACCs Capable of Processing Total Traffic Amount>

A description will be given of determination of minimum ACCs capable of processing the total traffic amount. The basic idea of reconfiguration of the offload destinations is not to replace the tasks already present in ACCs but to rearrange tasks into ACCs in a blank state.

(1) All the ACC capacities are summed up to find the ACC capacity.

(2) The capacity of the remaining ACC with the largest capacity is subtracted from the ACC capacity.

(3) The ACC capacity is compared with the total traffic of the tasks.

(3-1) When the ACC capacity is larger, the ACC regarding which subtraction is previously performed is determined as an unnecessary ACC and the processing proceeds to (2) above.

(3-2) When the ACC capacity is smaller and there is an ACC with the next smaller capacity, the subtracted capacity is restored, the capacity of the ACC with the next smaller capacity is subtracted, and the processing proceeds to (3-1) above.

(3-3) When the ACC capacity is smaller and there is no ACC with the next smaller capacity, the process finishes.

(4) the Remaining ACCs Are Determined as the Minimum ACCs.

Figure 21:
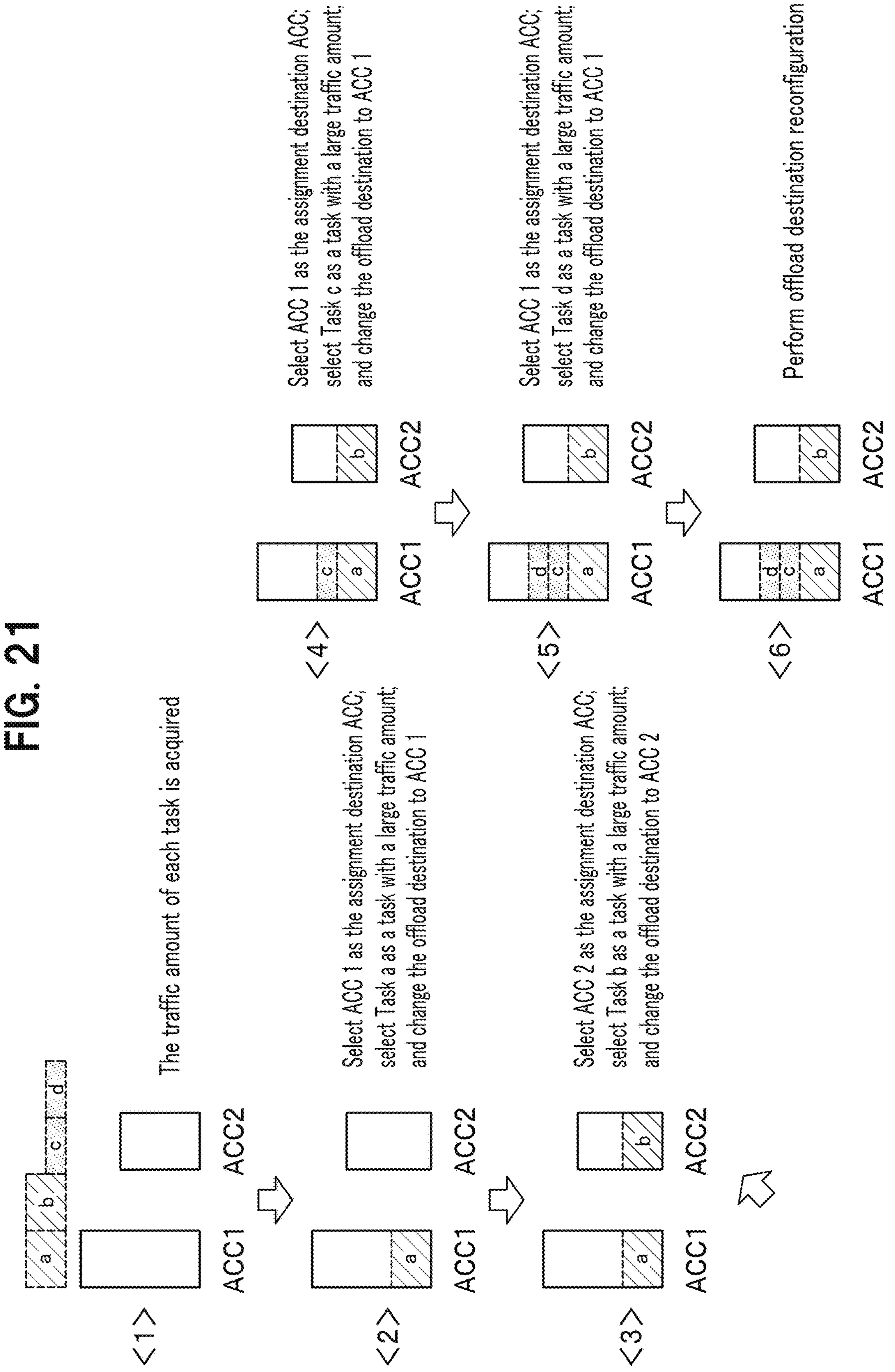
FIG. 21 is a diagram schematically illustrating reconfiguration of the offload destination taking into account the optimum assignment in Feature <2> of the power saving accelerator management system according to the embodiment of the present invention.

FIG. 21 is a diagram schematically illustrating <reconfiguration of offload destinations taking into account the optimum assignment in Feature <2>>. Thin solid blocks in FIG. 21 indicate the allowable traffics of ACC 1 and ACC 2, and hatching in FIG. 21 indicates the ACC traffic amount (Task a, b, c, or d). In the case of FIG. 21, the allowable traffic (free capacity) of ACC 1 is larger than the allowable traffic (free capacity) of ACC 2, and is represented by the size of the block. Further, Tasks a and b have a larger traffic amount than Tasks c and d, and are indicated by the size of the dashed blocks.

FIG. 21 <1>

The traffic amount of each task is acquired.

FIG. 21 <2>

ACC 1 is selected as the assignment destination ACC, Task a is selected as a task with a large traffic amount, and the offload destination is changed to ACC 1. As the allowable traffic (free capacity) of ACC 1 is larger than the allowable traffic (free capacity) of ACC 2, Task a is selected for ACC 1. In this case, selection is made first from Tasks a and b having a large ACC traffic amount.

FIG. 21 <3>

ACC 2 is selected as the assignment destination ACC, Task b is selected as a task with a large traffic amount, and the offload destination is changed to ACC 2. Although Task a has been selected for ACC 1 in <2> above, ACC 1 still has a free capacity. Meanwhile, there is no ACC traffic amount (task) in ACC 2. Therefore, Task b is selected for the purpose of above-described <task load distribution>, and the offload destination is changed to ACC 2.

FIG. 21 <4>

ACC 1 is selected as the assignment destination ACC, Task c (Task c has a traffic amount next to Tasks a and b) is selected as a task with a large traffic amount, and the offload destination is changed to ACC 1. In <3> above, Tasks a and b of the same traffic amount are offloaded to ACC 1 and ACC 2, respectively. Therefore, it can be said that ACC 1 and ACC 2 have returned to the state of <1> above in terms of the allowable traffic (free capacity).

Therefore, Task c is selected and the offload destination is changed to ACC 1.

FIG. 21 <5>

ACC 1 is selected as the assignment destination ACC, Task d is selected as a task with a large traffic amount, and the offload destination is changed to ACC 1. Although Task a and Task c have been selected for ACC 1, Task d is selected further. That is, although Task d can be selected for ACC 2, Task d is selected with priority given to <task load distribution> to change the offload destination to ACC 1.

FIG. 21 <6>

The task a, the task c, and the Task d are selected for ACC 1, and the Task b is selected for ACC 2 and the offload destination reconfiguration is executed.

The reconfiguration of the offload destination taking into account the optimum assignment (Feature <2>) has been described.

Scale Triggering Based on Traffic and Performance Information (Feature <3>)

A description will be given of scale triggering based on traffic and performance information (Feature <3>).

Scale triggering based on the traffic and the performance information (Feature <3>) achieves <Requirement 2: Power saving property> and <Requirement 3: Performance> at the same time by triggering a change of offload destinations in a timely manner according to the traffic and the performance value.

Figure 22:
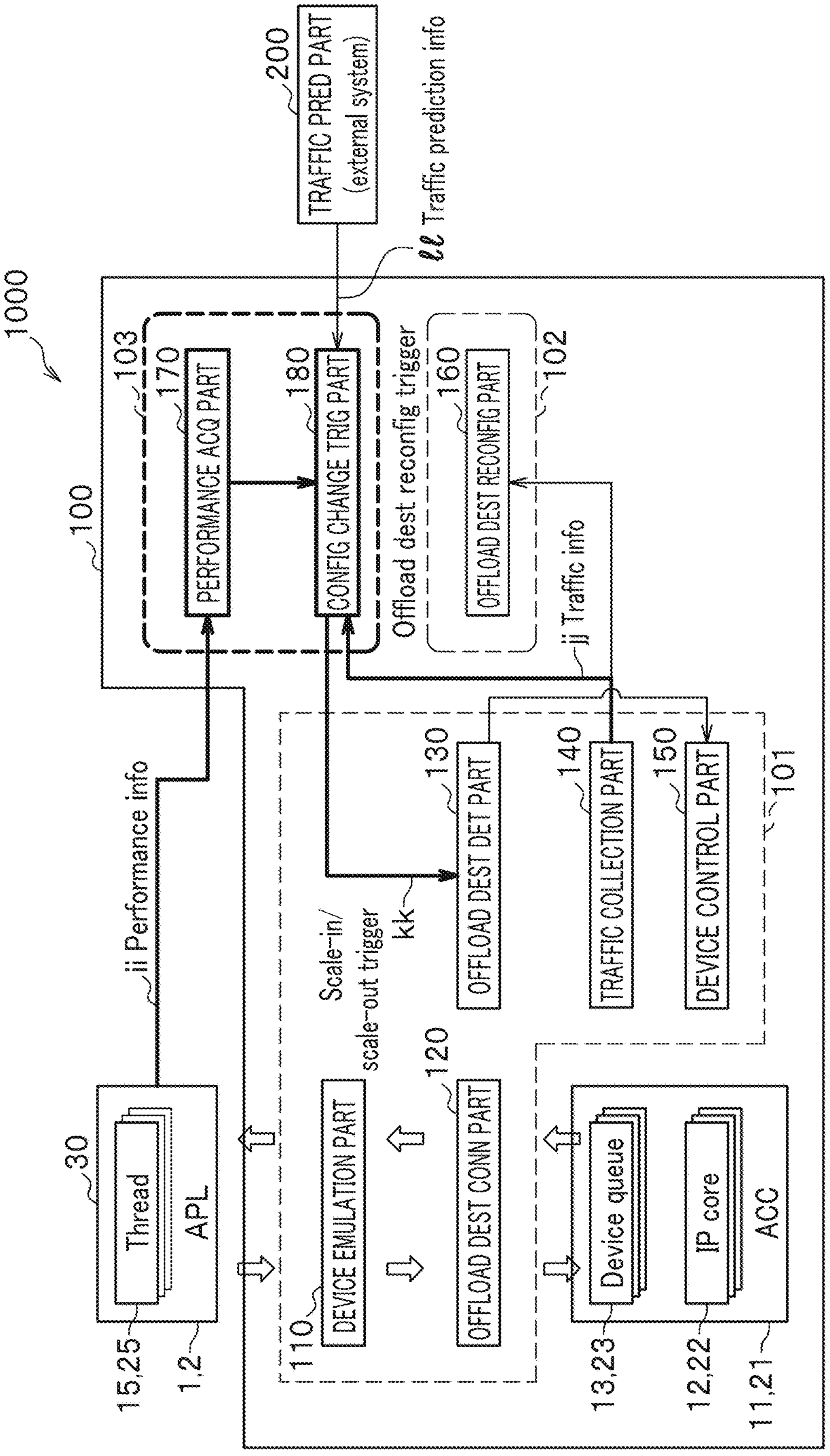
FIG. 22 is an operation explanatory diagram for describing scale triggering based on traffic and performance information (Feature <3>) of the power saving accelerator management system according to the embodiment of the present invention.

FIG. 22 is an operation explanatory diagram of the power saving accelerator management system for describing scale triggering based on the traffic and the performance information (Feature <3>). The same components as those in FIG. 1 are denoted by the same reference signs. The functional parts pertinent to the operations described in the following description are represented by thick frames.

Feature <3> is implemented by a scale trigger part 103 illustrated in the dashed line in FIG. 22. Specifically, it is described below.

Performance acquisition part 170, illustrated in FIG. 22, acquires the current performance (delay, throughput, and the like) of APLs 1 and 2 and provides the acquired performance to configuration change trigger part 180.

Configuration change trigger part 180 determines whether to issue an ACC scale-in/scale-out based on the traffic information (see reference sign jj) obtained from traffic collection part 140 and the performance information (see reference sign ii) obtained from performance acquisition part 170 to trigger (see reference sign kk) offload destination determination part 130 to perform ACC scaling-in/scaling-out. Alternatively, configuration change trigger part 180 triggers offload destination reconfiguration part 160 to perform offload destination reconfiguration.

The power saving accelerator management system 1000 of FIG. 22 acquires (reference sign ll of FIG. 22) the traffic prediction information from a traffic prediction part 200 existing in an external system.

Configuration change trigger part 180 scales in/scales out according to future traffic prediction in cooperation with traffic prediction part 200 existing in the external system.

Scale triggering based on the traffic and the performance information (Feature <3>) is characterized in the ACC scaling-in/scaling-out taking into account <excess of resource> and <insufficiency of resource>.

Figure 23:
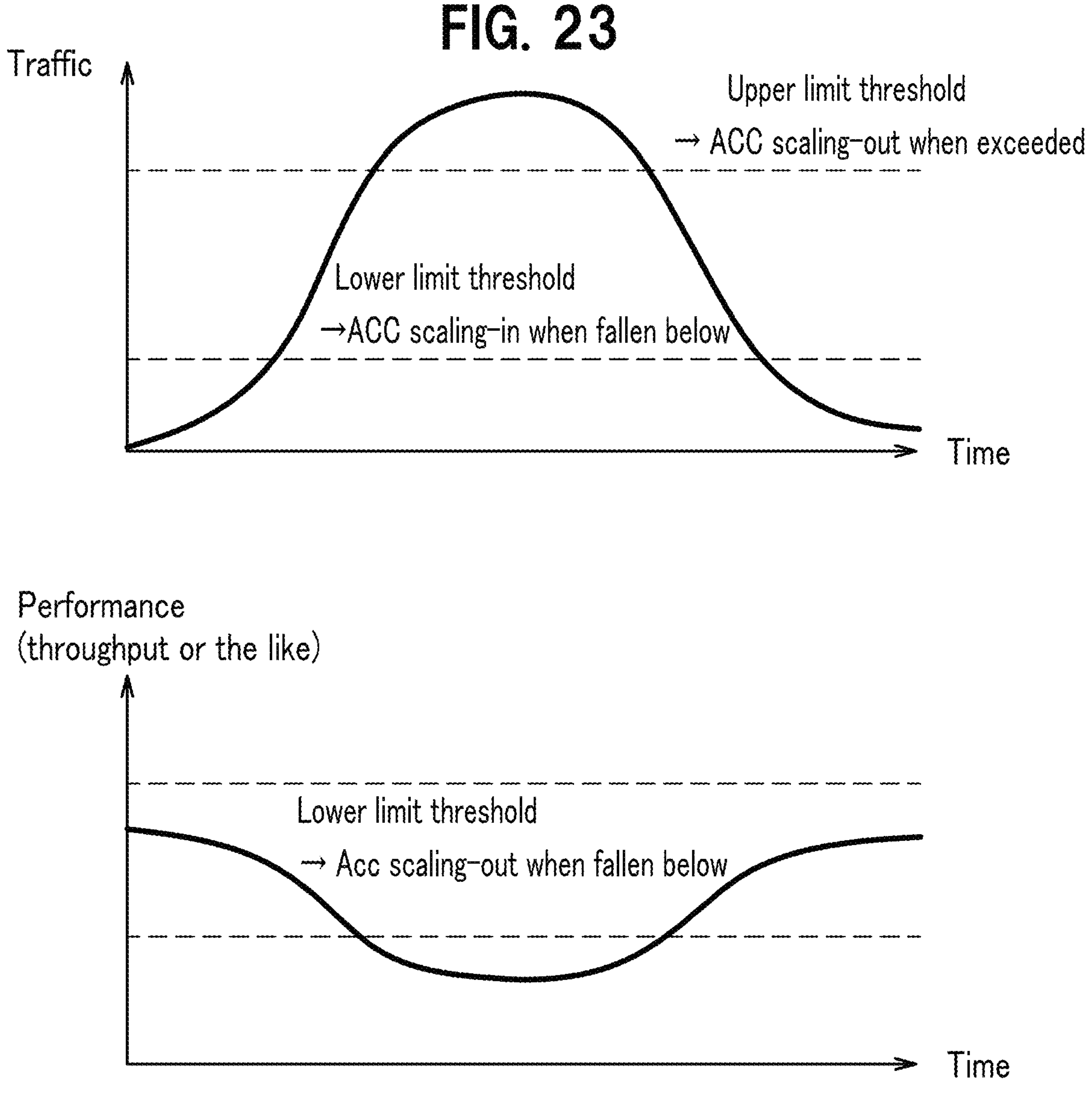
FIG. 23 is an explanatory diagram illustrating ACC scaling-in/scaling-out taking into account <excess of resource> and <insufficiency of resource> of Feature <3> of the power saving accelerator management system according to the embodiment of the present invention.

FIG. 23 is an explanatory diagram illustrating ACC scaling-in/scaling-out taking into account <excess of resource> and <insufficiency of resource> of Feature <3>. The upper diagram in FIG. 23 illustrates variation in the traffic over time; and the lower diagram in FIG. 23 illustrates variation in the performance such as throughput as the time elapses.

<Excess of Resource>

As illustrated in the upper diagram of FIG. 23, when the traffic amount obtained from traffic collection part 140 falls below a lower limit threshold, configuration change trigger part 180 triggers offload destination determination part 130 to perform ACC scaling-in.

This will allow for timely scaling-in and contribute to <Requirement 2: Power saving property>.

<Insufficiency of Resource>

As illustrated in the lower diagram of FIG. 23, when the performance obtained from performance acquisition part 170 falls below a lower limit threshold, configuration change trigger part 180 triggers offload destination determination part 130 to perform ACC scaling-out. Further, when the traffic amount exceeds an upper limit threshold, configuration change trigger part 180 triggers offload destination determination part 130 to perform ACC scaling-out.

This will allow for timely scaling-out and contribute to <Requirement 3: Performance>.

Here, configuration change trigger part 180 may use both the ACC scaling-out trigger based on the traffic amount illustrated in the upper diagram in FIG. 23 and the ACC scaling-out trigger based on the performance illustrated in the lower diagram in FIG. 23.

<Feature <3>: Scale Triggering Based on Traffic and Performance Information>

Scale triggering based on the traffic and the performance information in Feature will be described with reference to the control sequence of FIG. 24 and the flowchart of FIG. 25.

Figure 24:
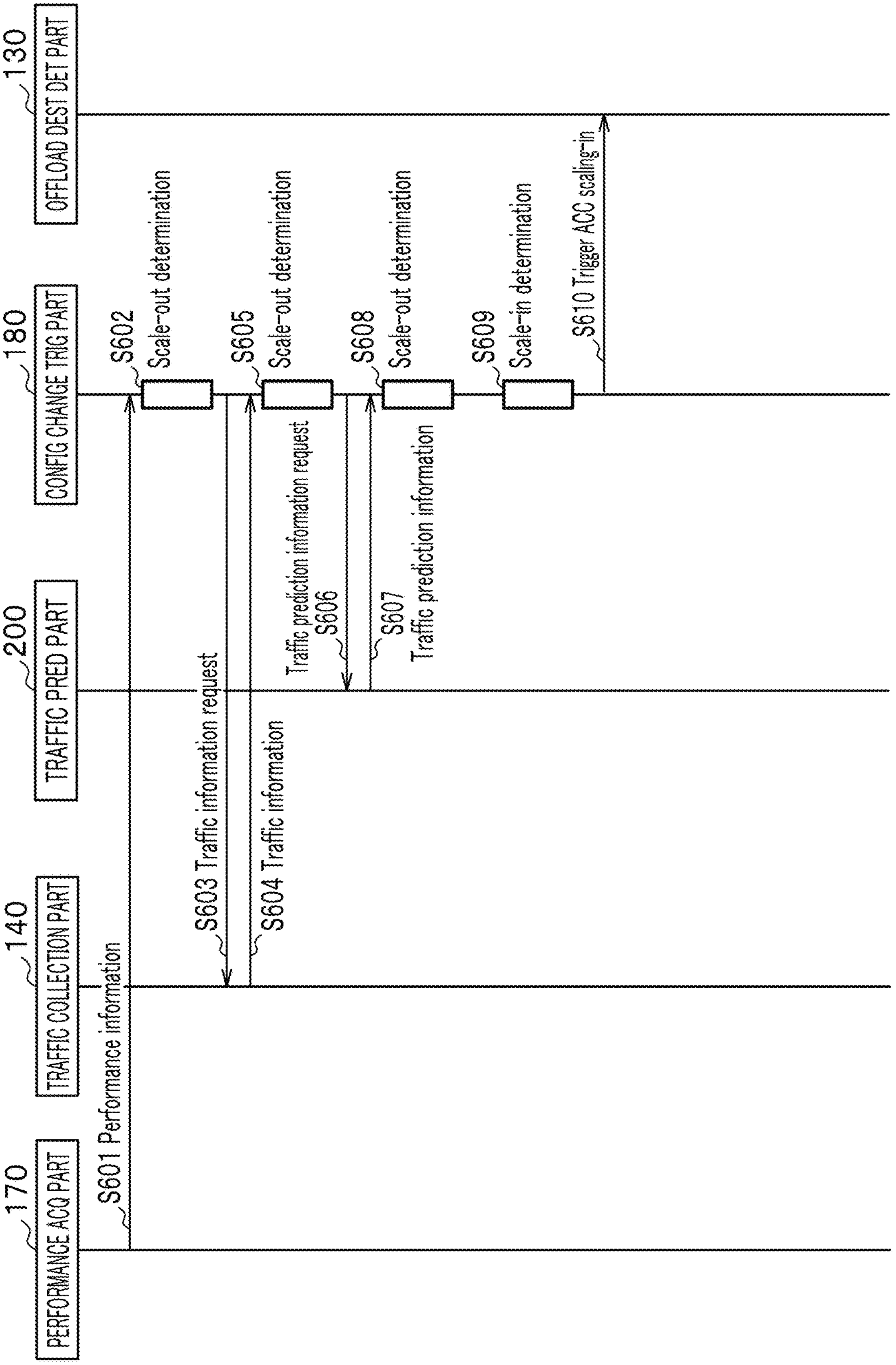
FIG. 24 is a control sequence for describing scale triggering based on the traffic and performance information in Feature <3> of the power saving accelerator management system according to the embodiment of the present invention.

FIG. 24 is a control sequence for describing scale triggering based on the traffic and the performance information in Feature <3>.

Performance acquisition part 170 acquires the performance of each APL and notifies (step S601) configuration change trigger part 180 of the acquired performance.

Configuration change trigger part 180 performs (step S602) scale-out determination based on the performance of each APL. When scaling-out is unnecessary, configuration change trigger part 180 requests (step S603) traffic information from traffic collection part 140.

Traffic collection part 140 collects the traffic of each ACC and notifies (step S604) configuration change trigger part 180 of the collected traffic.

Configuration change trigger part 180 performs (step S605) scale-out determination based on the traffic of each ACC. When scaling-out is unnecessary, configuration change trigger part 180 requests (step S606) traffic prediction information from traffic prediction part 200 of the external system.

The traffic prediction part 200 notifies (step S607) configuration change trigger part 180 of the traffic prediction information of each APL.

Configuration change trigger part 180 performs (step S608) scale-out determination based on the traffic prediction information of each APL. When scaling-out is unnecessary, configuration change trigger part 180 performs scale-in determination (step S609). When scaling-in is required, configuration change trigger part 180 issues an ACC scaling-in trigger to offload destination determination part 130 (step S610).

Figure 25:
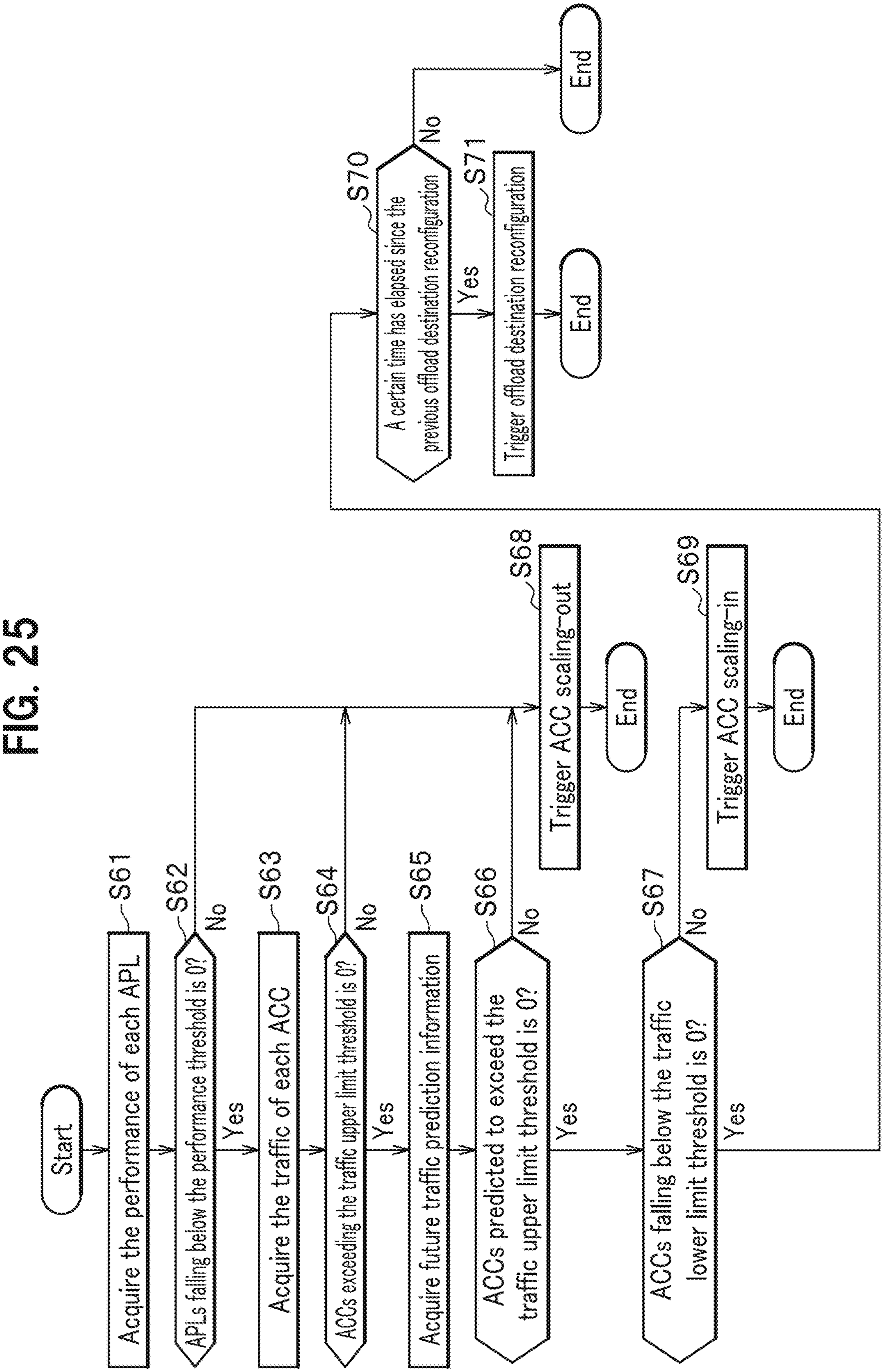
FIG. 25 is a diagram illustrating a flowchart of scale triggering based on A traffic and performance information of a configuration change trigger part in the control sequence of FIG. 24.

FIG. 25 is a diagram illustrating a flowchart of the scale triggering based on the A traffic and performance information of configuration change trigger part 180 in the control sequence of FIG. 24.

In step S61, performance acquisition part 170 acquires the performance of each APL.

In step S62, configuration change trigger part 180 determines whether the APLs falling below the performance threshold is 0.

When the APLs falling below the performance threshold is 0 (S62: Yes), configuration change trigger part 180 acquires the traffic of each ACC in step S63.

In step S64, configuration change trigger part 180 determines whether the ACCs exceeding a traffic upper limit threshold is 0.

When the ACCs exceeding the traffic upper limit threshold is 0 (S64: Yes), the future traffic prediction information is acquired in step S65.

In step S66, configuration change trigger part 180 determines whether the ACCs predicted to exceed the traffic upper limit threshold is 0.

In either one of the case where in above-described step S62 the APLs falling below the performance threshold is not 0 (S62: No), the case where in above-described step S64 the ACCs exceeding the traffic upper limit threshold is not 0 (S64: No), or the case where in above-described step S66 the ACCs predicted to exceed the traffic upper limit threshold is not 0 (S66: No), in step S68, configuration change trigger part 180 triggers ACC scaling-out and finishes the processing of the present flow.

In step S66 above, when the ACCs predicted to exceed the traffic upper limit threshold is 0 (S66: Yes), in step S67, configuration change trigger part 180 determines whether the ACCs falling below the traffic lower limit threshold is 0.

When the ACCs falling below the traffic lower limit threshold is not 0 (S68: No), in step S69, configuration change trigger part 180 triggers ACC scaling-in and finished the processing of the present flow.

When the ACCs falling below the traffic lower limit threshold is 0 (S67: Yes), in step S70, configuration change trigger part 180 determines whether a certain time has elapsed since the previous offload destination reconfiguration.

When the certain time has elapsed since the previous offload destination reconfiguration (S70: Yes), in step S71, configuration change trigger part 180 triggers offload destination reconfiguration and finishes the processing of the present flow. When the certain time has not elapsed since the previous offload destination reconfiguration (S70: No), the processing of the present flow is finished.

A description will be given of determination of the presence or absence of an ACC predicted to exceed the traffic upper limit threshold.

The determination of the presence or absence of an ACC predicted to exceed the traffic upper limit threshold is performed as follows, for example.

Update the traffic amount of each task corresponding to the traffic of each of APLs 1 and 2 at a certain time t later.

Calculate, for each ACC, a total value of the traffic amount of the task at a certain time t later.

Compare, for each ACC, with the traffic upper limit threshold

Here, when t is very small, the determination may be made with the upper limit threshold lowered.

Hardware Configuration

Figure 26:
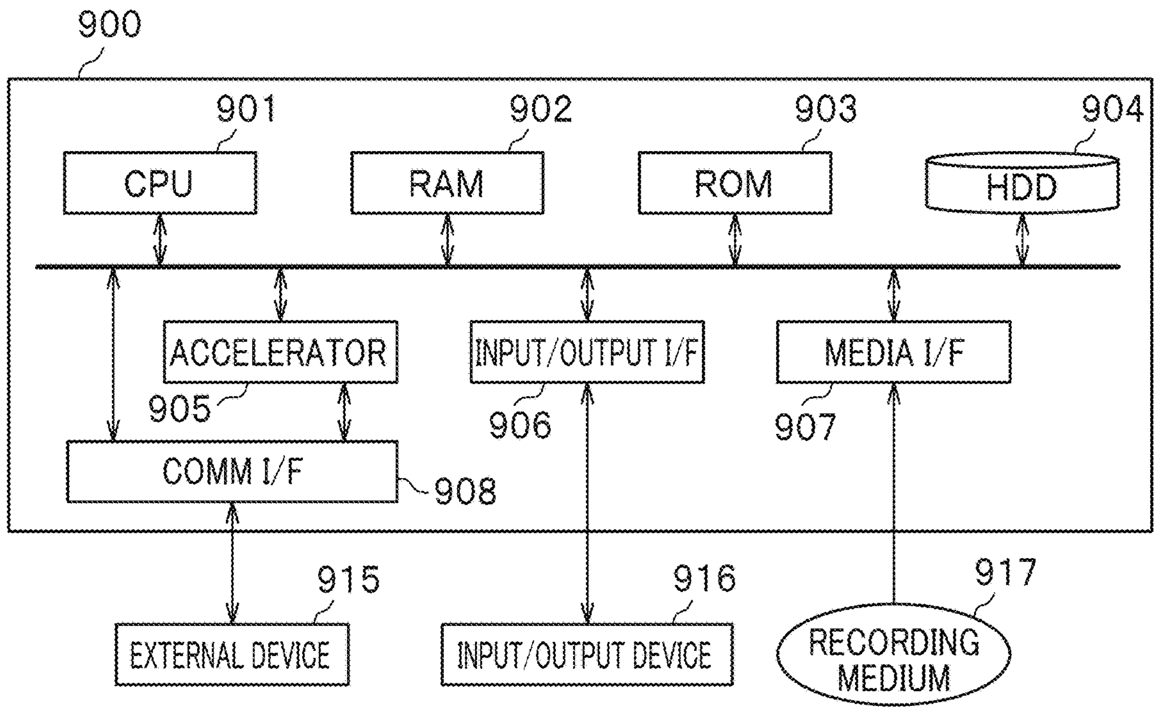
FIG. 26 is a hardware configuration diagram illustrating an example of a computer that implements functions of the accelerator offload device according to the embodiment of the present invention.

The accelerator offload device 100 according to the above-described embodiment is implemented by a computer 900 having the configuration illustrated in FIG. 26, for example.

FIG. 26 is a hardware configuration diagram illustrating an example of computer 900 that implements the functions of accelerator offload device 100.

Computer 900 includes a CPU 901, a RAM 902, a ROM 903, an HDD 904, an accelerator 905, an input/output interface (I/F) 906, a media interface (I/F) 907, and a communication interface (I/F) 908. Accelerator 905 corresponds to accelerator 11 in FIGS. 1, 7, 17, and 22.

Accelerator 905 is an accelerator (device) 11 or 21 (FIG. 1, 7, 17, or 22) that processes at least one of data from communication I/F 908 and data from RAM 902 at high speed.

Accelerator 905 may be of a type (look-aside type) that performs processing from CPU 901 or RAM 902 and then returns the execution result to CPU 901 or RAM 902. On the other hand, accelerator 905 may also be of a type (in-line type) that is interposed between communication I/F 908 and CPU 901 or RAM 902 and performs the processing. A1065

Accelerator 905 is connected to an external device 915 via communication I/F 908. Input/output I/F 906 is connected to an input/output device 916. Media I/F 907 reads/writes data from/to a recording medium 917.

CPU 901 operates according to a program stored in ROM 903 or HDD 904 and controls each component of accelerator offload device 100 in FIGS. 1, 7, 17, and 22 by executing the program (also referred to as an application or App as an abbreviation thereof) read in the RAM 902. The program can be delivered via a communication line or delivered by being recorded in recording medium 917 such as a CD-ROM.

ROM 903 stores a boot program to be executed by CPU 901 when computer 900 is activated, a program that depends on the hardware of computer 900, and the like.

CPU 901 controls input/output device 916 including an input unit such as a mouse or a keyboard and an output unit such as a display or a printer via input/output I/F 906. CPU 901 acquires data from input/output device 916 and outputs generated data to input/output device 916 via input/output I/F 906. Note that a graphics processing unit (GPU) or the like may be used as a processor in conjunction with CPU 901.

HDD 904 stores a program to be executed by CPU 901, data to be used by the program, and the like. Communication I/F 908 receives data from another device via a communication network (e.g. network (NW)) and outputs the data to CPU 901 and also transmits data generated by CPU 901 to another device via the communication network.

Media I/F 907 reads a program or data stored in the recording medium 917 and outputs the program or data to the CPU 901 via the RAM 902. CPU 901 loads a program for the desired processing from recording medium 917 onto RAM 902 via media I/F 907 and executes the loaded program. Recording medium 917 is an optical recording medium such as a digital versatile disc (DVD) or a phase change rewritable disk (PD), a magneto-optical recording medium such as a magneto optical disk (MO), a magnetic recording medium, a conductor memory tape medium, a semiconductor memory, or the like.

For example, in a case where computer 900 functions as accelerator offload device 100 configured as a device according to the present embodiment, CPU 901 of computer 900 implements the functions of accelerator offload device 100 by executing the program loaded onto RAM 902. HDD 904 stores data in RAM 902. CPU 901 reads the program for the desired processing from recording medium 917 and executes the program. In addition, CPU 901 may read the program for the desired processing from another device via the communication network.

Effects

As described above, the accelerator offload device 100 (FIG. 1, 7, 17, or 22) according to the present embodiment is an accelerator offload device that includes a plurality of accelerators and offloads specific processing of an application to the accelerators, the accelerator offload device including: a traffic collection part 140 that collects traffic information at the current time of the offload target processing being performed and/or predicted traffic information; a device emulation part 110 that conceals connection destination switching viewed from the application so as to pretend that the application is communicating with an accelerator; an offload destination determination part 130 that determines an offload destination based on the traffic information collected by the traffic collection part 140 and provides offload destination information pertinent to the application; an offload destination connection part 120 that connects device emulation part 110 and an accelerator of the offload destination according to the offload destination information provided by offload destination determination part 130; and a device control part 150 that performs a power operation to power on or off a device including the accelerator according to an instruction from offload destination determination part 130.

With this, a function of receiving tasks from the application on behalf of the accelerator changes the offload destination to switch the offload destinations of the tasks without modification of the application. In addition, when the traffic decreases, the offload destinations of all the tasks on one accelerator is switched to another accelerator and a power operation to power off the other accelerator is performed (accelerator scaling-in). In addition, a power operation to power on a surplus accelerator is performed and the offload destinations of a part of the tasks on an accelerator having performance concerns is switched to the accelerator (accelerator scaling-out).

As a result, it is possible to reduce the power consumption by dynamically causing minimum required accelerators to operate without causing the application to be conscious of. By utilizing the mechanism of accelerator scaling-out and/or load distribution, it is possible to prevent the performance deterioration due to the number of operating accelerators being small.

As a result, it is possible to reduce the power consumption of the accelerator without causing the performance deterioration of the application due to the reduction in the power consumption of the accelerator while eliminating the need of adding a function of supporting power saving in the application. That is, it is possible to reduce the power consumption by dynamically causing the minimum required accelerators to operate without causing the application to be conscious of. By utilizing the mechanism of accelerator scaling-out and/or load distribution, it is possible to prevent the performance deterioration due to the number of operating accelerators being small.

When a plurality of accelerators is mounted on a server that cause an application such as vRAN to operate, it is possible to enjoy the following effects by applying the accelerator offload device 100.

Power saving property: It is possible to reduce unnecessary power consumption by always causing only necessary accelerators to operate.

Performance: It is possible to avoid service impact due to performance shortfalls by adding operational accelerators as the demand increases.

Accelerator offload device 100 according to the present embodiment performs accelerator scaling-in of: by offload destination determination part 130, when traffic decreases, switching the offload destination of a task on one of the accelerators to the other accelerator; and by device control part 150, powering off the pertinent accelerator.

With this, it is possible to reduce the power consumption of the accelerator without deteriorating the performance of the application when there is a surplus of accelerator resources. As a result, it is possible to minimize the power consumed by a plurality of accelerators mounted on the server.

Accelerator offload device 100 according to the present embodiment performs accelerator scaling-out of: by device control part 150, performing a power operation to power on a surplus accelerator, and by offload destination determination part 130, switching the offload destination of a part of the tasks on an accelerator having performance concerns to the pertinent accelerator.

In this way, a power operation to power on a surplus accelerator is performed and the offload destinations of a part of the tasks on an accelerator having performance concerns is switched to the accelerator (accelerator scaling-out). As a result, it is possible to prevent the performance deterioration due to the number of operating accelerators being small.

Accelerator offload device 100 according to the present embodiment further includes an offload destination reconfiguration part 160 that recalculates offload destinations based on the traffic information collected by the traffic collection part 140 and provides offload destination reconfiguration information to offload destination determination part 130.

With this, it is possible to achieve <Requirement 2: Power saving property> and <Requirement 3: Performance> at the same time by triggering a change of offload destinations in a timely manner according to the traffic information.

In accelerator offload device 100 according to the present embodiment, as reconfiguration of the offload destinations taking into account the optimum assignment, in <redetermination of power-off ACC>, for example, when the accelerator whose power is larger than the accelerator that has been powered off through accelerator scaling-in can be powered off, offload destination reconfiguration part 160 provides the offload destination reconfiguration information to offload destination determination part 130 to modify an offload destination of a task to the pertinent accelerator, offload destination determination part 130 modifies the offload destination of the task based on the offload destination reconfiguration information, and device control part 150 powers off the accelerator whose power is large. Further, as the reconfiguration of the offload destinations taking into account the optimum assignment, in <task load distribution>, offload destination reconfiguration part 160 recalculates the offload destinations based on the traffic information collected by the traffic collection part 140, and when it is possible to perform task load distribution for each minimum required ACC, provides the offload destination reconfiguration information to the offload destination determination part 130 to modify the offload destinations of the tasks, and offload destination determination part 130 modifies offload destinations of tasks.

With this, device control part 150 contributes to <Requirement 2: Power saving property> by powering off the ACC whose power is large by <redetermination of power-off ACC>. Further, it is possible to contribute to <Requirement 3: Performance> by reducing the risk leading to the performance deterioration when the traffic increases due to <task load distribution>.

Accelerator offload device 100 according to the present embodiment further includes a performance acquisition part 170 that acquires performance information including a delay and a throughput of the application; and a configuration change trigger part 180 that determines whether to issue an accelerator scale-in or an accelerator scale-out based on the traffic information collected by traffic collection part 140 and the performance information acquired by performance acquisition part 170 and triggers offload destination determination part 130 to perform accelerator scaling-in or accelerator scaling-out or triggers offload destination reconfiguration part 160 to perform offload destination reconfiguration.

With this, configuration change trigger part 180 achieves <Requirement 2: Power saving property> and <Requirement 3: Performance> at the same time by triggering a change of the offload destination in a timely manner according to the traffic and the performance values. Specifically, configuration change trigger part 180, when the traffic amount acquired from traffic collection part 140 is lower than the threshold, determines that <excess of resource> is occurring and triggers offload destination determination part 130 to perform ACC scaling-in to attempt scaling-in in a timely manner, thereby contributing to <Requirement 2: Power saving property>. Specifically, configuration change trigger part 180, when the traffic amount acquired from traffic collection part 140 is larger than the threshold or when the performance acquired from performance acquisition part 170 is lower than a threshold, determines that <insufficiency of resource> is occurring and triggers offload destination determination part 130 to perform ACC scaling-out to attempt scaling-out in a timely manner, thereby contributing to <Requirement 3: Performance>.

Note that, among the processing described in the above embodiment, all or some of the processing described as being automatically performed may be manually performed, or all or some of the processing described as being manually performed may be automatically performed by a known method. Further, processing procedures, control procedures, specific name, and information including various types of data and parameters described in the specification and the drawings can be freely changed unless otherwise specified.

The constituent elements of the devices illustrated in the drawings are functionally conceptual ones and are not necessarily physically configured as illustrated in the drawings. In other words, a specific form of distribution and integration of individual devices is not limited to the illustrated form, and all or part thereof can be functionally or physically distributed and integrated in any unit according to various loads, usage conditions, and the like.

Some or all of the configurations, functions, processing parts, processing means, and the like described above may be implemented by hardware by, for example, being designed in an integrated circuit. Each of the configurations, functions, and the like may be implemented by software for interpreting and executing a program for causing a processor to implement each function. Information such as a program, table, and file for implementing each function can be held in a recording device such as a memory, hard disk, or solid state drive (SSD) or a recording medium such as an integrated circuit (IC) card, secure digital (SD) card, or optical disc.

REFERENCE SIGNS LIST

1, 2, 30 Application/application program (APL)
11, 21 Accelerator (ACC) (device)
13, 23 Device queue (physical queue)
15, 25 App thread
100 Accelerator offload device
110 Device emulation part
120 Offload destination connection part
130 Offload destination determination part
140 Traffic collection part
150 Device control part
160 Offload destination reconfiguration part
170 Performance acquisition part
180 Configuration change trigger part
200 Traffic prediction part
201 Device mapping table
202 Application management table
203 Task table
204 Traffic table
205 Device management table
1000 Power saving accelerator management system

The invention claimed is:

1. A non-transitory computer-readable storage medium storing a program that upon execution, causes a computer to operate as an accelerator offload device including a plurality of accelerators, wherein execution of the program causes the computer operating as the accelerator offload device to offload specific processing of an application to the plurality of accelerators, the program executing operations comprising:

collecting traffic information, the traffic information including information on traffic at a current time of offload target processing being performed and/or predicted traffic prediction information;

concealing connection destination switching viewed from the application so as to pretend that the application is communicating with one of the plurality of accelerators;

determining an offload destination based on the collected traffic information;

providing offload destination information pertinent to the application;

connecting the application and an accelerator of the offload destination according to the offload destination information, the accelerator of the offload destination being one of the plurality of accelerators; and performing a power operation to power on or off one of the plurality of accelerators according to an instruction provided by the determined offload destination.

2. The non-transitory computer-readable storage medium according to claim 1, wherein, to perform accelerator scaling-in, determining an offload destination comprises switching an offload destination of a task on a first one of the plurality of accelerators to a second one of the plurality of accelerators, when traffic decreases; and wherein performing a power operation comprises powering off the first one of the plurality of accelerators.

3. The non-transitory computer-readable storage medium according to claim 1, wherein, to perform accelerator scaling-out, performing a power operation comprises:

performing a power operation to power on a surplus accelerator of the plurality of accelerators; and switching an offload destination of a part of tasks on, of the plurality of accelerators, an accelerator having performance concerns to the surplus accelerator.

4. The non-transitory computer-readable storage medium according to claim 1, the operations further comprising reconfiguring an offload destination comprises:

recalculating offload destinations based on the collected traffic information; and providing offload destination reconfiguration information to the determined offload destination.

5. The non-transitory computer-readable storage medium according to claim 4, wherein reconfiguring an offload destination further comprises providing the offload destination reconfiguration information to the determined offload destination to modify an offload destination of a task to a first one of the plurality of accelerators, when the first one of the plurality of accelerators is powered off through accelerator scaling-in and a second one of the plurality of accelerators has a larger power consumption than the first one of the plurality of accelerators and can be powered off, wherein determining the offload destination further comprises modifying the offload destination of the task based on the offload destination reconfiguration information, and wherein performing a power operation further comprises powering off the second one of the plurality of accelerators.

6. The non-transitory computer-readable storage medium according to claim 4, wherein reconfiguring an offload destination further comprises recalculating the offload destinations based on the collected traffic information; and when performing task load distribution for each minimum required accelerator, providing the offload destination reconfiguration information to the determined offload destination to modify offload destinations of the tasks, and wherein determining an offload destination further comprises modifying the offload destinations of the tasks based on the offload destination reconfiguration information.

7. The non-transitory computer-readable storage medium according to claim 4, the operations further comprising:

acquiring performance information including a delay and a throughput of the application;

triggering configuration change of determining whether to issue an accelerator scale-in or an accelerator scale-out based on the collected traffic information and the acquired performance information; and triggering the determined offload destination to perform accelerator scaling-in or accelerator scaling-out; or triggering the reconfigured offload destination to perform offload destination reconfiguration.

8. An accelerator offload method of an accelerator offload device that includes a plurality of accelerators and offloads specific processing of an application to the plurality of accelerators, the accelerator offload method performed by the accelerator offload device comprising:

collecting traffic information, the traffic information including information on traffic at a current time of offload target processing being performed and/or predicted traffic prediction information;

concealing connection destination switching viewed from the application so as to pretend that the application is communicating with one of the plurality of accelerators;

determining an offload destination based on the collected traffic information;

providing offload destination information pertinent to the application;

connecting the application and an accelerator of the offload destination according to the provided offload destination information, the accelerator of the offload destination being one of the plurality of accelerators; and performing a power operation to power on or off one of the plurality of accelerators according to an instruction.

9. A non-transitory computer-readable medium storing a computer program for causing a computer to function as an accelerator offload device that includes a plurality of accelerators and offloads specific processing of an application to the plurality of accelerators, wherein execution of the program causes the computer to perform operations comprising:

collecting traffic information, the traffic information including information on traffic at a current time of offload target processing being performed and/or predicted traffic prediction information;

concealing connection destination switching viewed from an application so as to pretend that the application is communicating with one of the plurality of accelerators;

determining an offload destination based on the collected traffic information and providing offload destination information pertinent to the application;

connecting the application and an accelerator of the offload destination according to the provided offload destination information, the accelerator of the offload destination being one of the plurality of accelerators; and performing a power operation to power on or off one of the plurality of accelerators according to an instruction.

* * * * *